US008725367B2

(12) United States Patent
Tokura et al.

(10) Patent No.: US 8,725,367 B2
(45) Date of Patent: May 13, 2014

(54) CONTROL APPARATUS AND CONTROL METHOD FOR VEHICLE AUTOMATIC TRANSMISSION

(75) Inventors: Takaaki Tokura, Nagoya (JP); Hideaki Otsubo, Miyoshi (JP); Motonori Kimura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 179 days.

(21) Appl. No.: 13/055,777

(22) PCT Filed: Jul. 20, 2009

(86) PCT No.: PCT/IB2009/006286
§ 371 (c)(1),
(2), (4) Date: Jan. 25, 2011

(87) PCT Pub. No.: WO2010/013104
PCT Pub. Date: Feb. 4, 2010

(65) Prior Publication Data
US 2011/0125375 A1  May 26, 2011

(30) Foreign Application Priority Data
Aug. 1, 2008 (JP) ................. 2008-200088

(51) Int. Cl.
*G06F 17/00* (2006.01)
*B60W 10/10* (2012.01)
*F16H 59/48* (2006.01)
*F16H 61/00* (2006.01)

(52) U.S. Cl.
CPC ............. *G06F 17/00* (2013.01); *B60W 10/10* (2013.01); *F16H 59/48* (2013.01); *F16H 61/00* (2013.01)
USPC ............. 701/55; 701/56; 701/58; 701/64; 477/115; 477/116; 477/120

(58) Field of Classification Search
USPC .......... 701/51, 53, 54, 55, 58, 64, 56; 477/34, 477/98, 107, 110, 111, 115, 116, 120, 143, 477/144, 158, 37; 475/121; 74/336 R
See application file for complete search history.

(56) References Cited

U.S. PATENT DOCUMENTS 4,884,667 A * 12/1989 Koga ........................... 192/3.55
5,672,138 A *  9/1997 Mikami et al. ................ 477/111
(Continued)

FOREIGN PATENT DOCUMENTS

CN   A-101210616   7/2008
EP   1 939 502 A2   7/2008
(Continued)

OTHER PUBLICATIONS

International Search Report dated Nov. 3, 2009 in corresponding International Application No. PCT/IB2009/006286.

(Continued)

Primary Examiner — Helal A Algahaim
Assistant Examiner — Dale W Hilgendorf
(74) Attorney, Agent, or Firm — Oliff PLC

(57) ABSTRACT

In a control apparatus and a control method for a vehicle automatic transmission in which a plurality of gears with different speed ratios are achieved by selectively engaging a plurality of friction engagement devices and a one-way clutch, if an acceleration request is made in the case where the one-way clutch is in an idling state when a first predetermined gear is to be achieved by engaging the one-way clutch, a pre-synchronization control is executed to transmit torque through a predetermined friction engagement device used to achieve a second predetermined gear at which the one-way clutch is maintained in an idling state, and to continue to change a rotational direction of the one-way clutch toward a rotational direction in which the one-way clutch is brought to a synchronized state, according to the acceleration request.

24 Claims, 11 Drawing Sheets

(56) References Cited

U.S. PATENT DOCUMENTS

| | | | |
|---|---|---|---|
| 5,697,864 A * | 12/1997 | Watanabe | 477/98 |
| 5,833,573 A * | 11/1998 | Inuzuka et al. | 477/143 |
| 6,432,025 B1 | 8/2002 | Kondo et al. | |
| 6,626,786 B2 * | 9/2003 | Hayabuchi et al. | 475/127 |
| 6,656,084 B2 * | 12/2003 | Inoue et al. | 477/37 |
| 6,832,976 B2 * | 12/2004 | Nishida et al. | 477/120 |
| 7,211,027 B2 * | 5/2007 | Sakamoto et al. | 701/54 |
| 2005/0001480 A1 | 1/2005 | Tabata et al. | |
| 2007/0043496 A1 * | 2/2007 | Ogawa | 701/51 |
| 2007/0129214 A1 * | 6/2007 | Kondo et al. | 477/144 |
| 2008/0058158 A1 * | 3/2008 | Kobayashi et al. | 701/53 |
| 2008/0064563 A1 * | 3/2008 | Kobayashi et al. | 477/34 |
| 2008/0066567 A1 * | 3/2008 | Kobayashi et al. | 74/336 R |
| 2008/0287258 A1 * | 11/2008 | Moriya et al. | 477/116 |
| 2008/0288145 A1 | 11/2008 | Maeda et al. | |
| 2009/0192664 A1 * | 7/2009 | Wolfgang et al. | 701/29 |
| 2010/0063694 A1 * | 3/2010 | Lee et al. | 701/54 |

FOREIGN PATENT DOCUMENTS

| | | |
|---|---|---|
| JP | A-64-85844 | 3/1989 |
| JP | A-5-1589 | 1/1993 |
| JP | A-2008-157387 | 7/2008 |

OTHER PUBLICATIONS

Written Opinion of the International Searching Authority dated Nov. 3, 2009 in corresponding International Application No. PCT/IB2009/006286.

Notification of Reasons for Refusal dated Apr. 8, 2010 in corresponding Japanese Application No. 2008-200088 (with partial translation).

* cited by examiner

|     | C1 | C2 | C3 | C4 | B1 | B2  | F1 |
|-----|----|----|----|----|----|-----|----|
| P   |    |    |    |    |    |     |    |
| Rev1|    |    | O  |    |    | O   |    |
| Rev2|    |    |    | O  |    | O   |    |
| N   |    |    |    |    |    |     |    |
| 1st | O  |    |    |    |    | (O) | O  |
| 2nd | O  |    |    |    | O  |     |    |
| 3rd | O  | O  |    |    |    |     |    |
| 4th | O  |    |    | O  |    |     |    |
| 5th | O  | O  |    |    |    |     |    |
| 6th |    | O  |    | O  |    |     |    |
| 7th |    | O  | O  |    |    |     |    |
| 8th |    | O  |    |    | O  |     |    |

O : ENGAGED (O) : ENGAGED WHEN ENGINE BRAKE IS APPLIED

CONTROL APPARATUS AND CONTROL METHOD FOR VEHICLE AUTOMATIC TRANSMISSION

BACKGROUND OF THE INVENTION

1. Field of the Invention

The invention relates to a control apparatus and a control method for a vehicle automatic transmission, in which a plurality of gears are selectively achieved, the plurality of gears including a gear that is achieved by engaging a one-way clutch. More specifically, the invention relates to a technology for suppressing a shock when a one-way clutch is brought to a synchronized state.

2. Description of the Related Art

A vehicle, which includes an automatic transmission in which a plurality of gears with different speed ratios are achieved by selectively engaging a plurality of friction engagement devices and a one-way clutch, is available. In the vehicle, power output from a drive power source, such as an engine, is transmitted to drive wheels via the automatic transmission. In the vehicle, when the one-way clutch is brought to the synchronized state (that is, when the one-way clutch, which has been in an idling state, is brought to an engaged state), engine torque is transmitted in a stepwise manner, and thus, the torque is sharply increased. In addition, torque oscillates due to torsional vibration of a drive system. As a result, a shock (hereinafter, referred to "synchronization shock") may occur.

In order to reduce the synchronization shock caused by bringing the one-way clutch to the synchronized state, for example, a control apparatus for a vehicle automatic transmission described in Japanese Patent Application Publication No. 5-1589 (JP-A-5-1589) executes an engine torque decrease control to decrease an engine output when it is detected that the one-way clutch is about to be brought to the synchronized state at the time of reacceleration. This suppresses a sharp increase in the torque and torque oscillation at a time point at which the one-way clutch is brought to the synchronized state.

In the case where the one-way clutch is in the idling state when the gear is to be achieved by engaging the one-way clutch, a power transmission path in the automatic transmission is not formed, that is, power transmission in the automatic transmission is interrupted, in other words, the automatic transmission is in a so-called neutral state. The automatic transmission may be in the neutral state, for example, when an accelerator pedal is not operated and the vehicle is coasting. Even if a request for acceleration (hereinafter, may be referred to as "an acceleration request") is made by operating the accelerator pedal when the vehicle is coasting, drive power is not transmitted to drive wheels until the one-way clutch is brought to the synchronized state due to an increase in an engine rotational speed.

Accordingly, it is conceivable to execute a so-called engine torque increase control that increases engine torque to a value larger than engine torque that is normally output according to an accelerator pedal operation amount, in order to decrease a time period from when the accelerator pedal is operated until when the one-way clutch is brought to the synchronized state, to transmit drive power in quick response to the operation of the accelerator pedal (that is, to improve "a drive power response"), in other words, to promote synchronization of the one-way clutch.

FIG. 12 is a time chart showing a conventional control operation performed if an acceleration request is made in the case where the one-way clutch is in the idling state when a gear is to be achieved by engaging the one-way clutch. In FIG. 12, when the accelerator pedal is operated at time point $t_1$, the engine torque increase control is started at time point $t_2$ to promote the synchronization of the one-way clutch before the one-way clutch is brought to the synchronized state. Then, instead of the engine torque increase control, an engine torque decrease control is started to reduce the synchronization shock, at time point $t_3$ immediately before the one-way clutch is brought to the synchronized state. Then, output torque of the automatic transmission starts to be increased at time point $t_4$ at which the one-way clutch is brought to the synchronized state, and the output torque oscillates.

SUMMARY OF THE INVENTION

In the conventional control operation, the drive power response is improved and the synchronization shock is reduced only by controlling the output of the engine. That is, the drive power response and the synchronization shock cannot be separately controlled. Therefore, it is necessary to instantaneously change the control from the engine torque increase control to the engine torque decrease control. Accordingly, it may be difficult to improve the drive power response, and to reduce the synchronization shock at the same time, depending on the response of a change in the engine torque.

The invention provides a control apparatus and a control method for a vehicle automatic transmission, which improve a drive power response and reduce a synchronization shock if an acceleration request is made in the case where a one-way clutch is in an idling state when a gear is to be achieved by engaging the one-way clutch.

A first aspect of the invention relates to a control apparatus for a vehicle automatic transmission in which a plurality of gears with different speed ratios are achieved by selectively engaging a plurality of friction engagement devices and a one way clutch. The control apparatus includes an engaged state determination portion that determines whether the one-way clutch is in an engaged state when a first predetermined gear is to be achieved by engaging the one-way clutch; an acceleration request determination portion that determines whether an acceleration request for accelerating a vehicle is made; and a pre-synchronization control portion that executes a pre-synchronization control to transmit torque through a predetermined friction engagement device used to achieve a second predetermined gear at which the one-way clutch is maintained in an idling state, and to continue to change a rotational direction of the one-way clutch toward a rotational direction in which the one-way clutch is brought to a synchronized state, according to the acceleration request, and if the acceleration request determination portion determines that the acceleration request is made in a case where the engaged state determination portion determines that the one-way clutch is in the idling state when the first predetermined gear is to be achieved.

With the configuration, if the acceleration request is made in the case where the one-way clutch is in the idling state when the first predetermined gear is to be achieved, the pre-synchronization control portion executes the pre-synchronization control to transmit the torque through the predetermined friction engagement device used to achieve the second predetermined gear. Therefore, although the one-way clutch is in the idling state, that is, the one-way clutch has not been brought to the synchronized state when the first predetermined gear is to be achieved, the output torque (i.e., drive power or drive torque) is output from the automatic transmission. In this case, the second predetermined gear is not achieved by the pre-synchronization control executed by the pre-synchronization control portion, and the rotational direction of the one-way clutch continues to be changed toward the rotational direction in which the one-way clutch is brought to the synchronized state, according to the acceleration request. Therefore, the one-way clutch is reliably brought to the synchronized state, and the first predetermined gear is achieved. Thus, before the one-way clutch is brought to the synchronized state, the torque is output from the vehicle automatic transmission, and the drive power response is improved. In addition, because the torque has already been output from the vehicle automatic transmission when the one-way clutch is brought to the synchronized state, the output torque is not increased. Thus, the synchronization shock is suppressed.

In other words, because the torque is transmitted through the predetermined friction engagement device, which is used to achieve the second predetermined gear, the rotational direction of the one-way clutch is changed at a low rate toward the rotational direction in which the one-way clutch is brought to the synchronized state, as compared to the case where the rotational direction of the one-way clutch is changed toward the rotational direction in which the one-way clutch is brought to the synchronized state, according to the accelerkion request, when the torque is not transmitted through the predetermined friction engagement device. Thus, it is possible to suppress the synchronization shock. In this case, the synchronization of the one-way clutch is delayed as compared to the case where the one-way clutch is brought to the synchronized state, according to the acceleration request, when the torque is not transmitted through the predetermined friction engagement device. However, because the torque is output from the vehicle automatic transmission before the one-way clutch is brought to the synchronized state, the drive power response is improved, that is, the drive power response is not decreased.

Thus, it is possible to provide the control apparatus for the vehicle automatic transmission, which improves the drive power response and reduces the synchronization shock if the acceleration request is made in the case where the one-way clutch is in the idling state when the gear is to be achieved by engaging the one-way clutch.

In the above-described aspect, the vehicle automatic transmission may be a power transmission apparatus that transmits power output from a drive power source to a drive wheel; the rotational direction of the one-way clutch may be changed toward the rotational direction in which the one-way clutch is brought to the synchronized state, by increasing an input rotational speed of the vehicle automatic transmission according to the acceleration request; the second predetermined gear may be a gear higher than the first predetermined gear, and the input rotational speed of the vehicle automatic transmission at the second predetermined gear may be lower than the input rotational speed of the vehicle automatic transmission at the first predetermined gear; and the pre-synchronization control portion may execute the pre-synchronization control to transmit torque through the predetermined friction engagement device and to increase output torque of the drive power source to a value larger than required output torque of the drive power source corresponding to a required acceleration amount so that a target value of output torque of the vehicle automatic transmission is achieved, and the input rotational speed of the vehicle automatic transmission is increased according to a target value of the input rotational speed, wherein the target value of the output torque of the vehicle automatic transmission is increased with an increase in the required acceleration amount, and the target value of the input rotational speed of the vehicle automatic transmission is set to change the rotational direction of the one-way clutch toward the rotational direction in which the one-way clutch is brought to the synchronized state. With the configuration, the target value of the output torque of the vehicle automatic transmission is achieved. Therefore, before the one-way clutch is brought to the synchronized state, torque is appropriately output from the vehicle automatic transmission. In addition, the input rotational speed of the vehicle automatic transmission is increased so that the rotational direction of the one-way clutch is changed toward the rotational direction in which the one-way clutch is brought to the synchronized state. Therefore, the one-way clutch is reliably brought to the synchronized state.

In the above-described aspect, the output torque of the vehicle automatic transmission may be calculated based on a first predetermined relational expression so that the output torque of the vehicle automatic transmission is increased with an increase in the torque capacity of the predetermined friction engagement device, and the output torque of the vehicle automatic transmission is increased with an increase in an output torque increase amount by which the output torque of the drive power source is increased; a rotational speed increase amount, by which the input rotational speed of the vehicle automatic transmission is increased, may be calculated based on a second predetermined relational expression so that the rotational speed increase amount is decreased with an increase in the torque capacity of the predetermined friction engagement device, and the rotational speed increase amount is increased with an increase in the output torque increase amount by which the output torque of the drive power source is increased; and the pre-synchronization control portion may execute the pre-synchronization control to transmit the torque through the predetermined friction engagement device and to increase the output torque of the drive power source, based on the first predetermined relational expression and the second predetermined relational expression so that the output torque of the vehicle automatic transmission is equal to the target value determined based on an operation performed by a driver. With the configuration, the torque capacity of the predetermined friction engagement device used to achieve the second predetermined gear and the output torque increase amount, by which the output torque of the drive power source is increased, are calculated based on the first predetermined relational expression and the second predetermined relational expression so that the target value of the output torque of the vehicle automatic transmission is achieved, and the input rotational speed of the vehicle automatic transmission is increased according to the target value of the input rotational speed. Based on the calculated torque capacity and the calculated output torque increase amount, the operation of the predetermined friction engagement device and the output of the drive power source are appropriately controlled.

In the above-described aspect, the control apparatus for the vehicle automatic transmission may further include a post-synchronization control portion that executes a post-synchronization control to decrease a torque capacity of the predetermined friction engagement device and to decrease an output torque increase amount, by which the output torque of the drive power source is increased, so that the target value of the output torque of the vehicle automatic transmission is achieved using only the required output torque of the drive power source. In this case, after the one-way clutch is brought to the synchronized state, the post-synchronization control portion may execute the post-synchronization control, instead of the pre-synchronization control executed by the pre-synchronization control portion. With the configuration, after the one-way clutch is brought to the synchronized state, the torque transmitted through the predetermined friction engagement device by the pre-synchronization control executed by the pre-synchronization control portion and the output torque increase amount used in the pre-synchronization control are quickly decreased to zero. Accordingly, the normal control is quickly restarted. In the normal control, the target value of the output torque of the vehicle automatic transmission is achieved using only the required output torque of the drive power source.

In the above-described aspect, after the one-way clutch is brought to the synchronized state, the output torque of the vehicle automatic transmission may be calculated based on a third predetermined relational expression so that the output torque of the vehicle automatic transmission is decreased with an increase in the torque capacity of the predetermined friction engagement device, and the output torque of the vehicle automatic transmission is increased with an increase in the output torque increase amount by which the output torque of the drive power source is increased; and the post-synchronization control portion may execute the post-synchronization control to gradually decrease the output torque increase amount to zero, and to gradually decrease the torque capacity of the predetermined friction engagement device based on the third predetermined relational expression, in a predetermined time after the one-way clutch is brought to the synchronized state. With the configuration, the torque transmitted through the predetermined friction engagement device by the pre-synchronization control executed by the pre-synchronization control portion and the output torque increase amount used in the pre-synchronization control are decreased to zero in the predetermined time after the one-way clutch is brought to the synchronized state, based on the third predetermined relational expression.

In the above-described aspect, the torque may be transmitted through the predetermined friction engagement device by bringing the predetermined friction engagement device to a semi-engaged state.

In the above-described aspect, the target value of the output torque of the vehicle automatic transmission, which is used after the one-way clutch is brought to the synchronized state, may be set according to the required output torque of the drive power source; and the target value of the output torque of the vehicle automatic transmission, which is used before the one-way clutch is brought to the synchronized state, may be set to gradually increase toward the target value of the output torque of the vehicle automatic transmission, which is used after the one-way clutch is brought to the synchronized state.

In the above-described aspect, the target value of the input rotational speed, which is used after the one-way clutch is brought to the synchronized state, may be equal to a synchronous rotational speed of the input rotational speed at the first predetermined gear; the synchronous rotational speed at the first predetermined gear may be determined based on an output rotational speed of the vehicle automatic transmission and the speed ratio of the first predetermined gear; and the target value of the input rotational speed, which is used before the one-way clutch is brought to the synchronized state, may be set to gradually increase toward the synchronous rotational speed.

A second aspect of the invention relates to a control method for a vehicle automatic transmission in which a plurality of gears with different speed ratios are achieved by selectively engaging a plurality of friction engagement devices and a one way clutch. The control method includes determining whether the one-way clutch is in an engaged state when a first predetermined gear is to be achieved by engaging the one-way clutch; determining whether an acceleration request for accelerating a vehicle is made; and executing a pre-synchronization control to transmit torque through a predetermined friction engagement device used to achieve a second predetermined gear at which the one-way clutch is maintained in an idling state, and to continue to change a rotational direction of the one-way clutch toward a rotational direction in which the one-way clutch is brought to a synchronized state, according to the acceleration request, if it is determined that the acceleration request is made in a case where it is determined that the one-way clutch is in the idling state when the first predetermined gear is to be achieved.

The vehicle automatic transmission may be one of various planetary gear-type transmissions with multiple gears, for example, four forward gears, five forward gears, six forward gears, and seven or more forward gears, in which a plurality of gears are selectively achieved by selectively connecting rotational elements of plural sets of planetary gear units. Various friction engagement devices, such as a multiple-disc clutch, single-disc clutch, a brake, and a belt-type brake, may be employed as the friction engagement device in the planetary gear-type transmission with multiple gears. For example, the oil pump, which supplies hydraulic oil used to engage the hydraulic friction engagement device, may be driven by the drive power source for driving the vehicle, or may be driven by an electric motor that is used exclusively for driving the oil pump, and that is provided separately from the drive power source. Also, in addition to the hydraulic friction engagement device, an electromagnetic engagement device, such as an electromagnetic clutch or a magnetic particle clutch, may be employed as the clutch or the brake.

In the hydraulic pressure control circuit including the hydraulic friction engagement device, a hydraulic pressure output from, for example, a linear solenoid valve may be directly supplied to a hydraulic actuator (a hydraulic cylinder) for the hydraulic friction engagement device, in view of a response. Also, a shift control valve may be controlled using the hydraulic pressure output from the linear solenoid valve as a pilot hydraulic pressure, and the hydraulic oil may be supplied from the control valve to the hydraulic actuator.

One linear solenoid valve may be provided for a corresponding one of the plurality of hydraulic friction engagement devices. In addition to this configuration, various other configurations may be made. For example, in the case where there are the friction engagement devices that are not simultaneously engaged or disengaged, a common linear solenoid valve for the friction engagement devices may be provided. Also, the hydraulic pressures for all the hydraulic friction engagement devices need not necessarily be controlled by the linear solenoid valves. The hydraulic pressure for at least one hydraulic friction engagement device may be controlled using pressure adjustment means other than the linear solenoid valve. For example, the hydraulic pressure for at least one hydraulic friction engagement device may be controlled by executing a duty control of an on-off solenoid valve.

Various internal combustion engines, such as a gasoline engine and a diesel engine, are employed as the drive power source that drives the vehicle. Further, in addition to the engine, for example, an electric motor may be used as a subsidiary drive power source, or only the electric motor may be used as the drive power source that drives the vehicle.

In the specification, the phrase "the hydraulic pressure is supplied" signifies that the hydraulic pressure is applied or the hydraulic oil controlled by the hydraulic pressure is supplied.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 4 is a block diagram showing a main portion of a control system provided in a vehicle to control the automatic transmission and the like, in the embodiment of the invention;

FIG. 5 is a circuit diagram showing a main portion of a hydraulic pressure control circuit shown in FIG. 4, in the embodiment of the invention;

DETAILED DESCRIPTION OF EMBODIMENTS

Hereinafter, an embodiment of the invention will be described in detail with reference to the drawings.

Figures 1, 2:
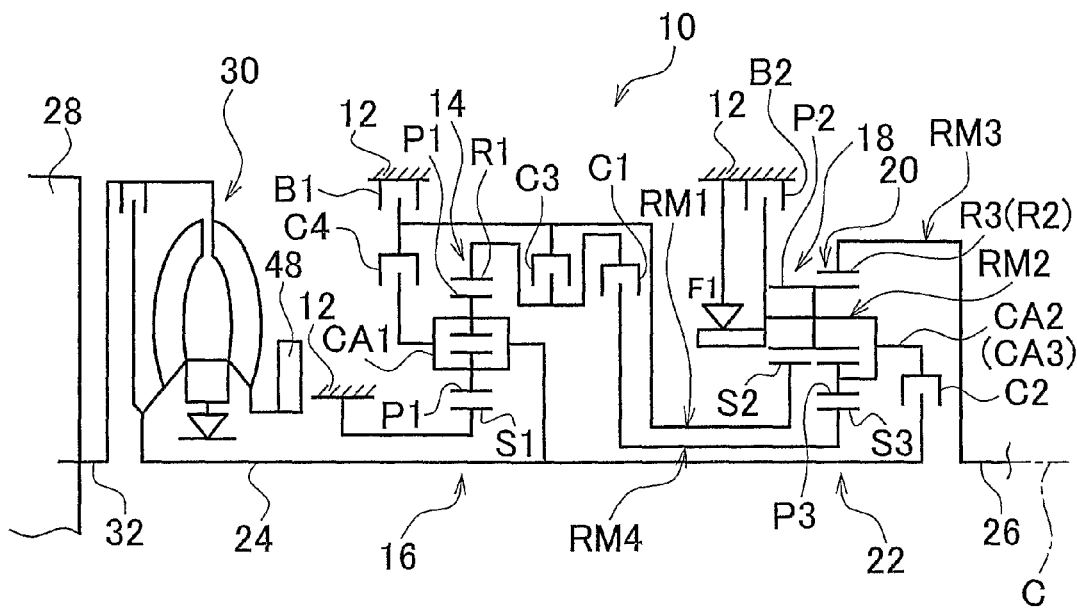
FIG. 1 is a schematic diagram showing a configuration of a vehicle automatic transmission, to which the invention is applied.
FIG. 2 is an operation diagram showing the combination of operations of friction engagement devices when each of a plurality of gears is achieved in the automatic transmission shown in FIG. 1 in an embodiment of the invention.

FIG. 1 is a schematic diagram showing a configuration of a vehicle automatic transmission (hereinafter, simply referred to as "automatic transmission") 10, to which the invention is applied. The automatic transmission 10 includes a first shift portion 16 and a second shift portion 22 that are provided on a common axis C in a transmission case (hereinafter, simply referred to as "case") 12. The transmission case 12, which is a non-rotational member, is fitted to a vehicle body. The first shift portion 16 mainly includes a first planetary gear unit 14 of a double pinion type. The second shift portion 22 mainly includes a second planetary gear unit 18 of a single pinion type and a third planetary gear unit 20 of a double pinion type. The automatic transmission 10 changes the speed of the rotation input from an input shaft 24, and outputs the rotation from an output shaft 26. The input shaft 24 may be regarded as an input-side rotational member. In the embodiment, the input shaft 24 is a turbine shaft of a torque converter 30 rotated by an engine 28 that is a power source for driving the vehicle. The output shaft 26 may be regarded as an output-side rotational member. For example, the output shaft 26 rotates right and left drive wheels 38 via a differential gear unit (a final reducer) 34 and a pair of axles.

The rotational speed of the input-side rotational member is a rotational speed before the automatic transmission 10 changes the rotational speed. For example, the input shaft 24 and a crankshaft 32 of the engine 28 may be regarded as the input-side rotational member. After the automatic transmission 10 changes the speed of the rotation input from the input-side rotational member, the automatic transmission 10 transmits the rotation to the output-side rotational member. For example, the output shaft 26, the differential gear unit 34, the axles 36, and the drive wheels 38 may be regarded as the output-side rotational member. Because the configuration of the automatic transmission 10 is substantially symmetric with respect to a centerline C (i.e., the axis of the automatic transmission 10), the lower portion of the automatic transmission 10 is omitted in the schematic diagram in FIG. 1.

The first planetary gear unit 14 is a planetary gear unit of a double pinion type. The first planetary gear unit 14 includes a sun gear S1, a plurality of pairs of pinions P1, a carrier CA1, and a ring gear R1. The paired pinions P1 engage with each other. The carrier CA1 supports the pinions P1 so that each pinion P1 rotates on its axis, and moves around the sun gear S1. The ring gear R1 engages with the sun gear S1 via the pinions P1. The sun gear S1, the carrier CA1, and the ring gear R1 constitute three rotational elements. The carrier CA1 is connected to the input shaft 24 so that the carrier CA1 is rotated. The sun gear S1 is integrally fixed to the case 12 so that the sun gear S1 is not be able to rotate. The ring gear R1 functions as an intermediate output member. The ring gear R1 is rotated so that the rotational speed of the ring gear R1 is lower than the rotational speed of the input shaft 24. The ring gear R1 transmits the rotation to the second shift portion 22.

The second planetary gear unit 18 is a planetary gear unit of a single pinion type. The second planetary gear unit 18 includes a sun gear S2, pinions P2, a carrier CA2, and a ring gear R2. The carrier CA2 supports the pinions P2 so that each pinion P2 rotates on its axis, and moves around the sun gear S2. The ring gear R2 engages with the sun gear S2 via the pinions P2. The third planetary gear unit 20 is a planetary gear unit of a double pinion type. The third planetary gear unit 20 includes a sun gear S3, a plurality of pairs of the pinion P2 and a pinion P3, a carrier CA3, and a ring gear R3. The paired pinions P2 and P3 engage with each other. The carrier CA3 supports the pinions P2 and P3 so that each of the pinions P2 and P3 rotates on its axis, and moves around the sun gear S3. The ring gear R3 engages with the sun gear S3 via the pinions P2 and P3.

In the second planetary gear unit 18 and the third planetary gear unit 20, four rotational elements RM1 to RM4 are constituted by connecting a part of the second planetary gear unit 18 to a part of the third planetary gear unit 20. More specifically, the first rotational element RM1 is constituted by the sun gear S2 of the second planetary gear unit 18. The second rotational element RM2 is constituted by integrally connecting the carrier CA2 of the second planetary gear unit 18 to the carrier CA3 of the third planetary gear unit 20. The third rotational element RM3 is constituted by integrally connecting the ring gear R2 of the second planetary gear unit 18 to the ring gear R3 of the third planetary gear unit 20. The fourth rotational element RM4 is constituted by the sun gear S3 of the third planetary gear unit 20. The carrier CA2 of the second planetary gear unit 18 and the carrier CA3 of the third planetary gear unit 20 are constituted by a common member. The ring gear R2 and the ring gear R3 are constituted by a common member. In addition, the pinions P2 of the second planetary gear unit 18 function as the second pinions of the third planetary gear unit 20. Thus, the second planetary gear unit 18 and the third planetary gear unit 20 constitute a Ravigneaux type planetary gear train.

The first rotational element RM1 (the sun gear S2) is selectively connected to the case 12 via a first brake B1 to stop the rotation of the first rotational element RM1. The first rotational element RM1 is selectively connected to the ring gear R1 of the first planetary gear unit 14, which is the intermediate output member, via a third clutch C3. Further, the first rotational element RM1 is selectively connected to the carrier CA1 of the first planetary gear unit 14 via a fourth clutch C4. The second rotational element RM2 (the carrier CA2 and the carrier CA3) is selectively connected to the case 12 via a second brake B2 to stop the rotation of the second rotational element RM2. In addition, the second rotational element RM2 is selectively connected to the input shaft 24 via a second clutch C2. The third rotational element RM3 (the ring gear R2 and the ring gear R3) is integrally connected to the output shaft 26 to output the rotation. The fourth rotational element RM4 (the sun gear S3) is connected to the ring gear R1 via a first clutch C1. A one-way clutch F1 is provided between the second rotational element RM2 and the case 12 in a manner such that the one-way clutch F1 is positioned in parallel with the second brake B2. The one-way clutch F1 permits positive rotation of the second rotational element RM2 (i.e., the rotation in the same direction as the direction of the rotation of the input shaft 24), and prevents negative rotation of the second rotational element RM2.

FIG. 2 is an operation diagram (an engagement operation table) showing the combination of operations of engagement devices (engagement elements) when each of a plurality of gears is achieved in the automatic transmission 10. When a circle is described in a section for one of the clutches C1 to C4 and the brakes B1 and B2, the circle signifies that the one of the clutches C1 to C4 and the brakes B1 and B2 is engaged. A circle surrounded by parentheses indicates that the brake B2 is engaged only when an engine brake is applied. When a section for one of the clutches C1 to C4 and the brakes B1 and B2 is blank, the blank signifies that the one of the clutches C1 to C4 and the brakes B1 and B2 is disengaged. In the automatic transmission 10, a plurality of gears with different gear ratios (speed ratios) γ (=the rotational speed of the input shaft 24/the rotational speed of the output shaft 26) are achieved by selectively engaging the clutches C1 to C4 and the brakes B1 and B2. For example, forward eight gears and reverse two gears are achieved. Also, particularly because the one-way clutch F1 is provided in parallel with the second brake B2, when the first gear ($1^{st}$) is achieved, the second brake B2 is engaged if the engine brake is applied, and the second brake B2 is disengaged if the engine is operating.

Each of the different gear ratios (speed ratios) y of the different gears are appropriately determined by gear ratios ρ1 to Σ3 (=the number of teeth of the sun gear/the number of teeth of the ring gear) of the first planetary gear unit 14, the second planetary gear unit 18, and the third planetary gear unit 20. Also, as evident from FIG. 2, each gear is achieved by engaging two of the clutches C1 to C4 and the brakes B1 and B2, that is, by performing a so-called clutch-to-clutch shift operation. Thus, a shift control is easily executed, and a shift shock is suppressed.

Each of the clutches C1 to C4 and the brakes B1 and B2 (hereinafter, simply referred to as "clutches C" "brakes B" if the clutches C and the brakes B need not be distinguished from each other) is a hydraulic friction engagement device (hereinafter, simply referred to as "engagement device") such as a multiple-disc clutch or a multiple-disc brake. The engagement of each engagement device is controlled by a hydraulic actuator. The state of each engagement device is switched between an engaged state and a disengaged state by energizing and de-energizing linear solenoid valves SL1 to SL6 in a hydraulic pressure control circuit 40 (refer to FIG. 4), and by controlling electric current. In addition, for example, when each engagement device is engaged or disengaged, a transient pressure is controlled by energizing and de-energizing the linear solenoid valves SL1 to SL6 in the hydraulic pressure control circuit 40 (refer to FIG. 4), and by controlling the electric current.

Figure 3:
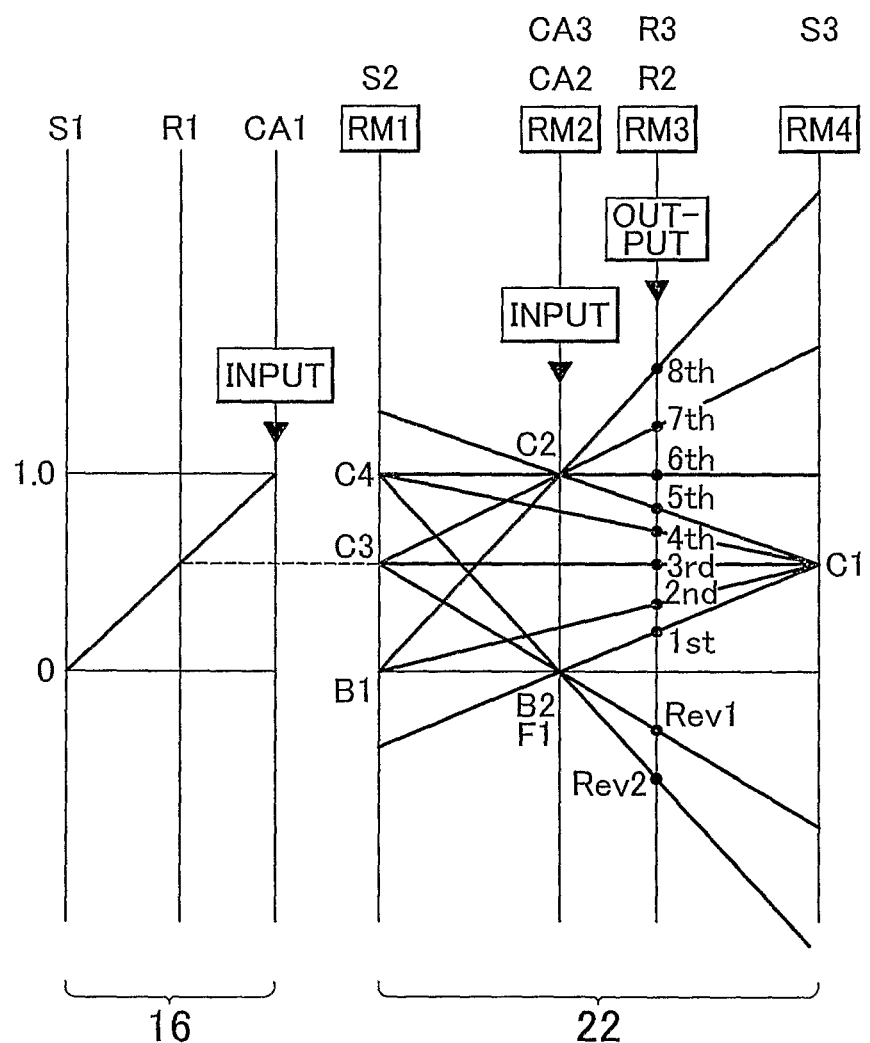
FIG. 3 is a collinear diagram showing operations of the vehicle automatic transmission shown in FIG. 1 in the embodiment of the invention.

FIG. 3 is a collinear diagram in which the rotational speed of each rotational element in the first shift portion 16 and the second shift portion 22 is indicated by a straight line. A lower horizontal line indicates a rotational speed "0", and an upper horizontal line indicates a rotational speed "1.0", that is, the same rotational speed as the rotational speed of the input shaft 24. Vertical lines in the first shift portion 16 indicate rotational speeds of the sun gear S1, the ring gear R1, and the carrier CA1 in the stated order from the left side in FIG. 3. Intervals between the vertical lines are set based on the gear ratio ρ1 of the first planetary gear unit 14. Four vertical lines in the second shift portion 22 indicate the rotational speeds of the first rotational element RM1 (the sun gear S2), the second rotational element RM2 (the carrier CA2 and the carrier CA3), the third rotational element RM3 (the ring gear R2 and the ring gear R3), and the fourth rotational element RM4 (the sun gear S3) in the stated order from the left side in FIG. 3. Intervals between the vertical lines are set based on the gear ratio ρ2 of the second planetary gear unit 18 and the gear ratio ρ3 of the third planetary gear unit 20.

As evident from the collinear diagram, when the first clutch C1 is engaged and the one-way clutch F1 is engaged (or the second brake B2 is engaged if the engine brake is applied), the fourth rotational element RM4 is rotated via the first shift portion 16 so that the rotational speed of the fourth rotational element RM4 is lower than the rotational speed of the input shaft 24, and the rotation of the second rotational element RM2 is stopped. Accordingly, the third rotational element RM3 connected to the output shaft 26 is rotated at the rotational speed indicated by "$1^{st}$" in FIG. 3. Thus, the first gear "$1^{st}$" with the largest gear ratio (speed ratio) γ1 is achieved. The other gears are achieved in the same manner by selectively engaging two of the clutches C and the brakes B.

Figure 4:
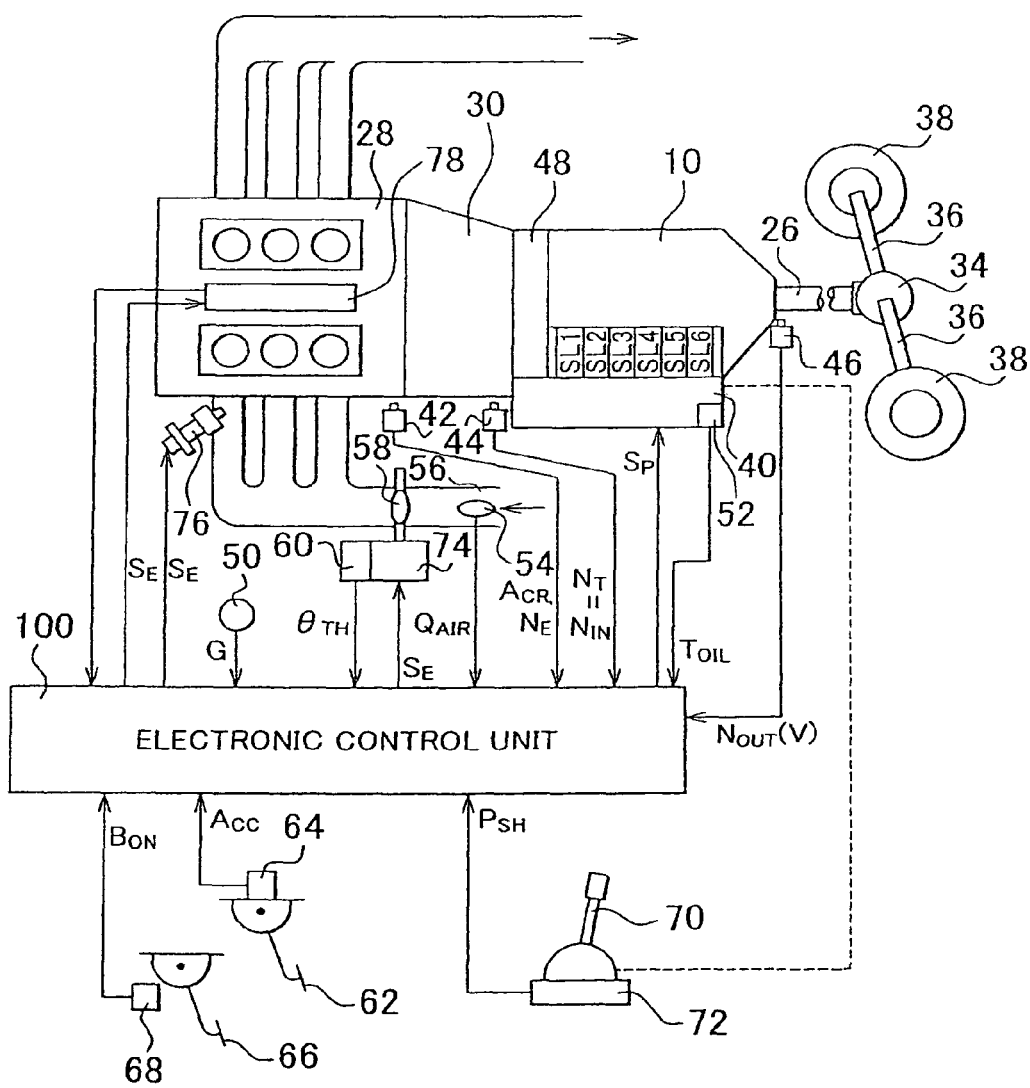
FIG. 4 is a diagram showing a schematic configuration of a power transmission path that includes the vehicle automatic transmission shown in FIG. 1, and that extends from an engine to drive wheels.

FIG. 4 is a diagram showing a schematic configuration of a power transmission path including the automatic transmission 10 in FIG. 1. The power transmission path extends from the engine 28 to the drive wheels 38. FIG. 4 is a block diagram showing a main portion of a control system provided in a vehicle to control the automatic transmission 10 and the like. For example, an electronic control unit 100 includes a so-called microcomputer that includes a CPU, a RAM, a ROM, and an input/output interface. The CPU basically executes, for example, an output control for the engine 28, and a shift control that automatically changes the gear of the automatic transmission 10 by executing signal processing according to programs stored in the ROM in advance, using a temporal storage function of the RAM. The electronic control unit 100 may include a control unit that controls the engine 28, and a control unit that executes the shift control by controlling the linear solenoid valves SL1 to SL6.

In FIG. 4, for example, the electronic control unit 100 receives signals indicating a crank angle (position) ACR (°) and an engine rotational speed $N_E$, an input rotational speed $N_{IN}$(=a turbine rotational speed $N_T$), an output rotational speed $N_{OUT}$, a vehicle speed V, acceleration (the deceleration) an oil temperature $T_{OIL}$, an intake air amount $Q_{AIR}$, a throttle valve opening amount $\theta_{TH}$, an accelerator pedal operation amount $A_{CC}$, a brake operation signal $B_{ON}$, and a lever position $P_{SH}$, from sensors and switches provided in the vehicle. For example, the electronic control unit 100 receives signals from a crank position sensor 42, an input rotational speed sensor 44, an output rotational speed sensor 46, an acceleration sensor 50, an oil temperature sensor 52, an intake air amount sensor 54, a throttle position sensor 60, an accelerator pedal operation amount sensor 64, a brake switch 68, and a shift position sensor 72. The crank position sensor 42 detects a crank position corresponding to the crank angle (position) ACR (°) and the rotational speed $N_E$ of the engine 28. The input rotational speed sensor 44 detects the rotational speed $N_T$ of the turbine shaft of the torque converter 30, that is, the rotational speed $N_{IN}$ of the input shaft 24 of the automatic transmission 10. The input rotational speed sensor 44 may be regarded as input-side rotational speed sensor. The output rotational speed sensor 46 detects the rotational speed $N_{OUT}$ of the output shaft 26 corresponding to a vehicle speed V, and may be regarded as the output-side rotational speed sensor. The acceleration sensor 50 detects the acceleration (deceleration) G of the vehicle. The oil temperature sensor 52 detects the automatic transmission oil temperature $T_{OIL}$ that is the temperature of hydraulic oil in the hydraulic pressure control circuit 40. The intake air amount sensor 54 detects the intake air amount $Q_{AIR}$ that is an amount of air taken into the engine 28. The throttle position sensor 60 detects the throttle valve opening amount $\theta_{TH}$ that is the opening angle of an electronic throttle valve 58 provided in an intake pipe 56. The accelerator pedal operation amount sensor 64 detects the accelerator pedal operation amount $A_{CC}$ that is the amount of operation of an accelerator pedal 62 depressed according to vehicle drive power required by a driver (i.e., a required acceleration amount). The accelerator pedal 62 may be regarded as an output operating member. The brake switch 68 detects a brake operation signal $B_{ON}$ indicating whether a foot brake 66, which is a regular brake, is operated. The shift position sensor 72 detects the lever position (the operation position) $P_{SH}$ of a shift lever 70 that may be regarded as a manual shift operating device.

The electronic control unit 100 outputs an engine output control command signal SE for the output control for the engine 28, such as a drive signal for a throttle actuator 74, which controls opening/closing of the electronic throttle valve 58 according to the accelerator opening amount $A_{cc}$, an injection signal that controls the amount of fuel injected from a fuel injection device 76, and an ignition timing signal that controls an ignition timing of the engine 28, at which an igniter 78 performs ignition. Also, the electronic control unit 100 outputs a-shift control command signal SP for the shift control for the automatic transmission 10, such as a valve command signal that controls energization/de-energization of the linear solenoid valves SL1 to SL6 in the hydraulic pressure control circuit 40 to change the gear of the automatic transmission 10, and a drive signal for a linear solenoid valve SLT, which controls a line pressure PL (for example PL1 and PL2).

Figure 5:
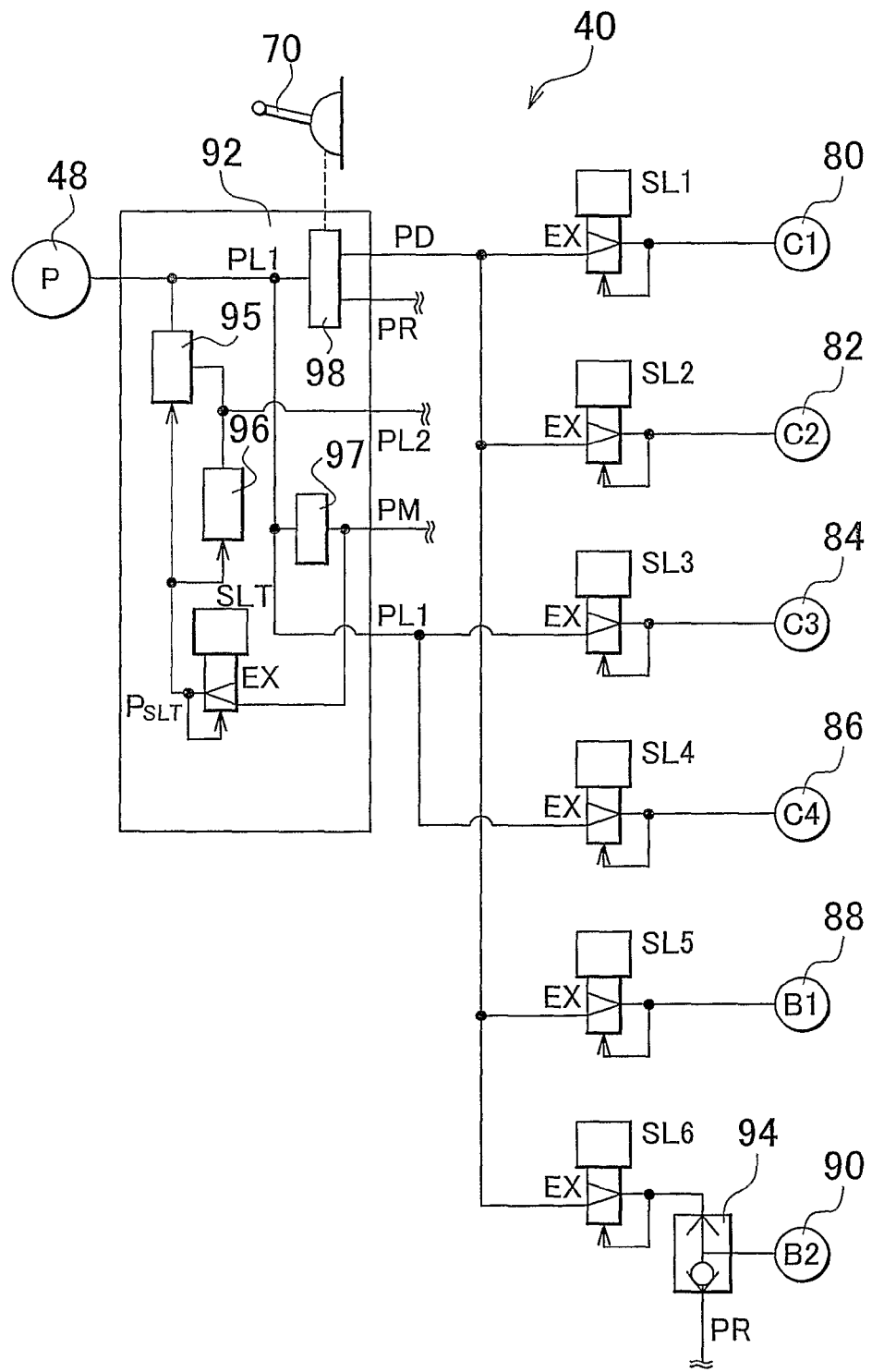
FIG. 5 is a circuit diagram relating to linear solenoid valves that control operations of hydraulic actuators for clutches and brakes.

FIG. 5 is a circuit diagram relating to, for example, the linear solenoid valves SL1 to SL6 that control operations of hydraulic actuators 80, 82, 84, 86, 88, and 90 for the clutches C and the brakes B. That is, FIG. 5 is a circuit diagram showing a main portion of the hydraulic pressure control circuit 40.

In FIG. 5, a D-range pressure (i.e., a forward range pressure, a forward hydraulic pressure) PD output from a hydraulic pressure supply device 92 is adjusted by the linear solenoid valves SL1, SL2, SL5, and SL6, and then, supplied to the hydraulic actuators (hydraulic cylinders) 80, 82, 88, and 90 for the clutches C1 and C2, and the brakes B1 and B2, respectively. A first line pressure PL1 output from the hydraulic pressure supply device 92 is adjusted by the linear solenoid valves SL3 and SL4, and then, supplied to the hydraulic actuators 84 and 86 for the clutches C3 and C4. One of a hydraulic pressure output from the linear solenoid valve SL6 and a reverse pressure (i.e., a reverse range pressure, a reverse hydraulic pressure) PR is supplied to the hydraulic actuator 90 for the brake B2 via a shuttle valve 94.

The hydraulic pressure supply device 92 includes a primary regulator valve 95, a secondary regulator valve 96, the linear solenoid valve SLT, a modulator valve 97, and a manual valve 98. The primary regulator valve 95 is, for example, a relief type valve. The primary regulator valve 95 regulates a first line pressure PL1 using, as a source pressure, a hydraulic pressure generated by a mechanical oil pump 48 rotated by the engine 28. The secondary regulator valve 96 regulates a second line pressure PL2 using, as a source pressure, a hydraulic pressure discharged from the primary regulator valve 95 to regulate the first line pressure PL1. The linear solenoid valve SLT supplies a signal pressure $P_{SLT}$ to the primary regulator valve 95 and the secondary regulator valve 96 so that the first line pressure PL1 and the second line pressure PL2 are regulated according to, for example, an engine load indicated by the accelerator pedal operation amount $A_{CC}$ or the throttle valve opening amount $\theta_{TH}$. The modulator valve 97 regulates a modulator pressure PM that is a constant pressure, using the first line pressure PL1 as a source pressure. A manual valve 98 is mechanically connected to the shift lever 70 via a cable or a link. When the shift lever 70 is operated, the manual valve 98 is mechanically operated and thus a hydraulic passage is changed. Accordingly, the first line pressure PL1 input to the manual valve 98 is output from the manual valve 98 as the D-range pressure PD when the shift lever 70 is moved to a position "D", and the first line pressure PL1 input to the manual valve 98 is output from the manual valve 98 as the reverse pressure PR when the shift lever 70 is moved to a position "R". Thus, the hydraulic pressure supply device 92 supplies the first line pressure PL1, the second line pressure PL2, the modulator pressure PM, the D-range pressure PD, and the reverse pressure PR.

The linear solenoid valves SL1 to SL6 basically have the same configuration. The linear solenoid valves SL1 to SL6 are energized and de-energized independently of each other by the electronic control unit 100. The hydraulic pressures for the hydraulic actuators 80 to 90 are controlled independently of each other, and thus, the engagement pressures for the clutches C1 to C4 and the brakes B1 and B2 are controlled. When predetermined engagement devices are engaged, for example, as shown in the engagement operation table in FIG. 2, each gear is achieved in the automatic transmission 10. Also, in the shift control for the automatic transmission 10, for example, engagement and disengagement of the clutches C and the brakes B relating to the gear shift are controlled at the same time, that is, the so-called clutch-to-clutch shift operation is performed. Thus, the transient disengagement pressure and the transient engagement pressure are appropriately controlled to suppress a shift shock.

Figure 6:
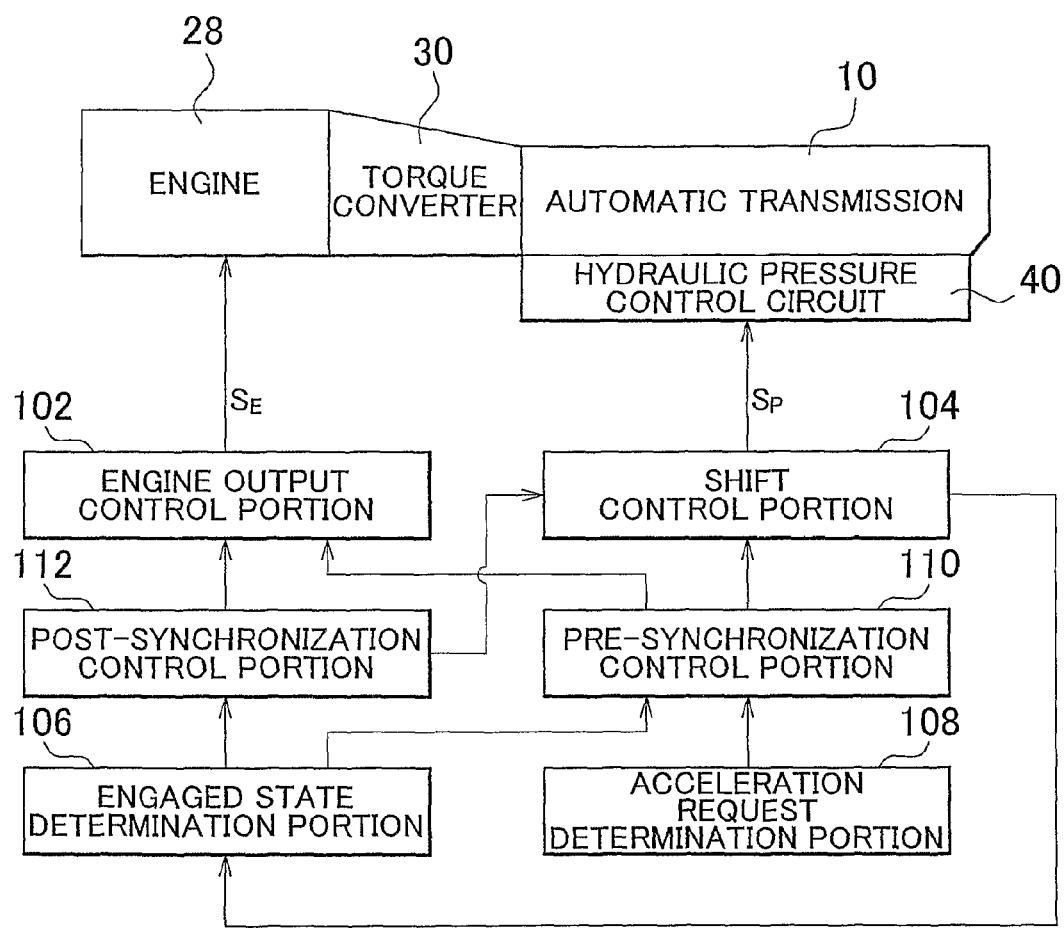
FIG. 6 is a functional block diagram showing main control functions of an electronic control unit in FIG. 4 in the embodiment of the invention.
Figure 7:
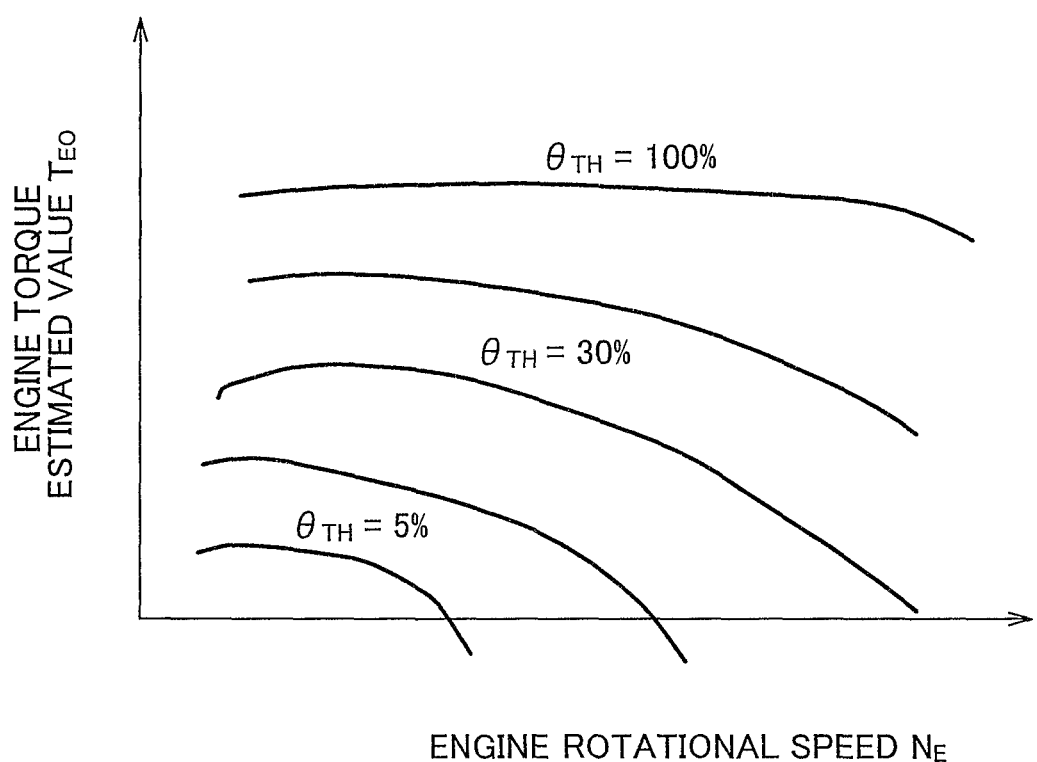
FIG. 7 is a relation (an engine torque map) between an engine rotational speed and an engine torque estimated value, which is empirically defined using a throttle valve opening amount as a parameter, and stored in advance, in the embodiment of the invention.

FIG. 6 is a functional block diagram showing main control functions of the electronic control unit 100. In FIG. 6, for example, an engine output control portion 102 outputs the engine output control command signal SE that controls the opening/closing of the electronic throttle valve 58 using the throttle actuator 74, controls the fuel injection device 76 to control the fuel injection amount, and controls the igniter 78 to control the ignition timing. For example, the engine output control portion 102 controls the opening/closing of the electronic throttle valve 58 using the throttle actuator 74 so that the throttle valve opening amount $\theta_{TH}$ is made equal to a value at which target engine torque $T_E^*$ is achieved, based on the actual engine rotational speed $N_E$, according to a relation between the engine rotational speed $N_E$ and an engine torque estimated value $T_{E0}$ (i.e., an engine torque map indicating the relation), which is empirically defined using the throttle valve opening amount $\theta_{TH}$ as a parameter and stored in advance, as shown in FIG. 7. For example, the electronic control unit 100 determines the target engine torque $T_E^*$ based on the accelerator pedal operation amount $A_{CC}$ corresponding to the acceleration amount required by the driver so that the target engine torque $T_E^*$ is increased as the accelerator pedal operation amount $A_{CC}$ is increased. The target engine torque $T_E^*$ is equivalent to driver required engine torque $T_{EDEM}$ that is engine torque required by the driver.

Figure 8:
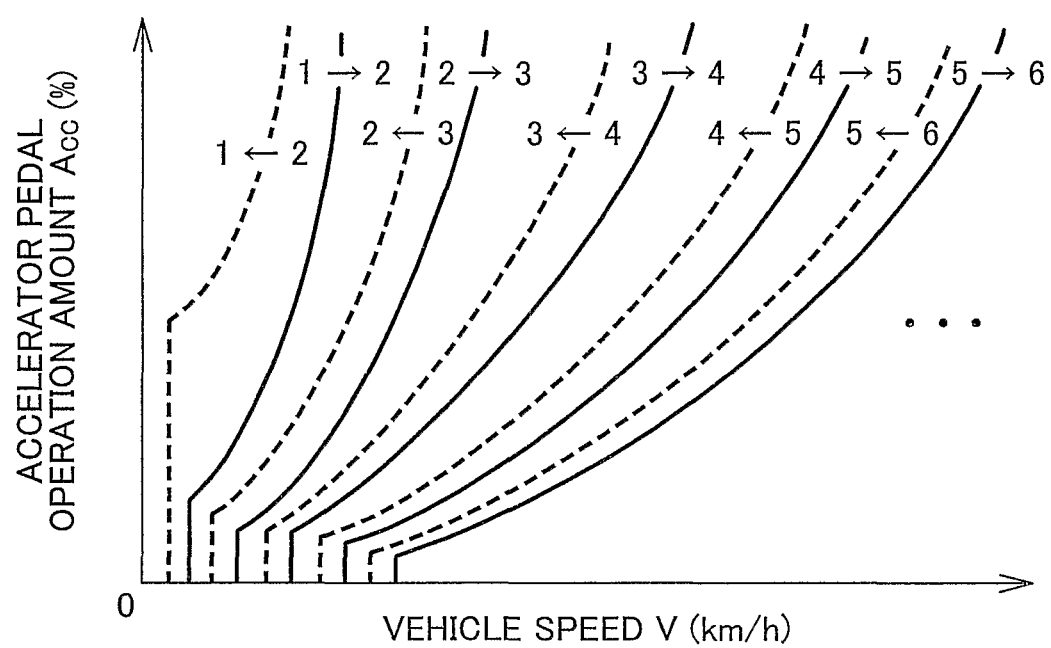
FIG. 8 is a diagram showing an example of a shift diagram used in a shift control executed by the electronic control unit shown in FIG. 4, in the embodiment of the invention.

A shift control portion 104 performs a shift determination based on the actual vehicle speed V and the actual accelerator pedal operation amount $A_{CC}$ according to, for example, a relation (i.e., a shift map, a shift diagram) in which the vehicle speed V and the accelerator pedal operation amount $A_{CC}$ are used as parameters as shown in FIG. 8, and which is stored in advance. More specifically, the shift control portion 104 determines whether the automatic transmission 10 is to be shifted, for example, the shift control portion 104 determines the gear to which the automatic transmission 10 is to be shifted, based on the actual vehicle speed V and the actual accelerator pedal operation amount $A_{CC}$, according to the relation. Then, the shift control portion 104 executes an automatic shift control for the automatic transmission 10 so that the determined gear is achieved. At this time, the shift control portion 104 outputs the shift control command signal SP (i.e., a shift output command, a hydraulic pressure command) that engages and/or disengages the hydraulic friction engagement devices relating to the gear shift of the automatic transmission 10, to the hydraulic pressure control circuit 40 so that the gear is achieved according to, for example, the engagement table as shown in FIG. 2.

The linear solenoid valves SL1 to SL6 in the hydraulic pressure control circuit 40 are driven according to the command SP so that the automatic transmission 10 is shifted. Thus, the actuators 80 to 90 for the hydraulic friction engagement devices relating to the gear shift of the automatic transmission 10 are operated.

In the shift diagram in FIG. 8, each solid line is a shift line (an upshift line) used to determine whether the automatic transmission 10 is to be upshifted, and each dashed line is a shift line (a downshift line) used to determine whether the automatic transmission 10 is to be downshifted. Each shift line is used to determine whether the actual vehicle speed V moves on a horizontal line indicating the actual accelerator pedal operation amount $A_{CC}$(%) and crosses the shift line, that is, whether the vehicle speed V becomes higher than, or lower than a value (a shift point vehicle speed) VS on the shift line, at which the automatic transmission 10 is to be shifted. Thus, each shift line is generated by connecting the values VS, that is, the shift point vehicle speeds, and stored in advance. FIG. 8 shows examples of the shift lines in a range from the first gear to the sixth gear, although the automatic transmission 10 is shifted in a range from the first gear to the eighth gear.

For example, when the shift control portion 104 determines that the actual vehicle speed V crosses a $2^{nd}$ to $3^{rd}$ upshift line that indicates that the automatic transmission 10 is to be upshifted from the second gear to the third gear, that is, when the shift control portion 104 determines that the actual vehicle speed V becomes higher than the shift point vehicle speed V2-3, the shift control portion 104 outputs a command that disengages the brake B1 and engages the clutch C3, to the hydraulic pressure control circuit 40. That is, the shift control portion 104 outputs, to the linear solenoid valve SL5, the command that de-energizes the linear solenoid valve SL5 to drain the engagement pressure for the brake B1. In addition, the shift control portion 104 outputs, to the linear solenoid valve SL3, the command that energizes the linear solenoid valve SL3 to supply the engagement pressure for the clutch C3.

Thus, the shift control portion 104 controls the energization and de-energization of each of the linear solenoid valves SL1 to SL6, thereby changing the state of each of the clutches C1 to C4 and the brakes B1 and B2 corresponding to the linear solenoid valves SL1 to SL6, between the engaged state and the disengaged state so that one of the gears is achieved. Also, the shift control portion 104 executes a feedback control or a learning control of the engagement pressure (the transient disengagement pressure and/or the transient engagement pressure) during a gear shift process based on the turbine rotational speed $N_T$ and the output rotational speed $N_{OUT}$ to suppress a shift shock and to increase a shift response. Thus, the clutch-to-clutch shift operation is performed.

Figure 9A:
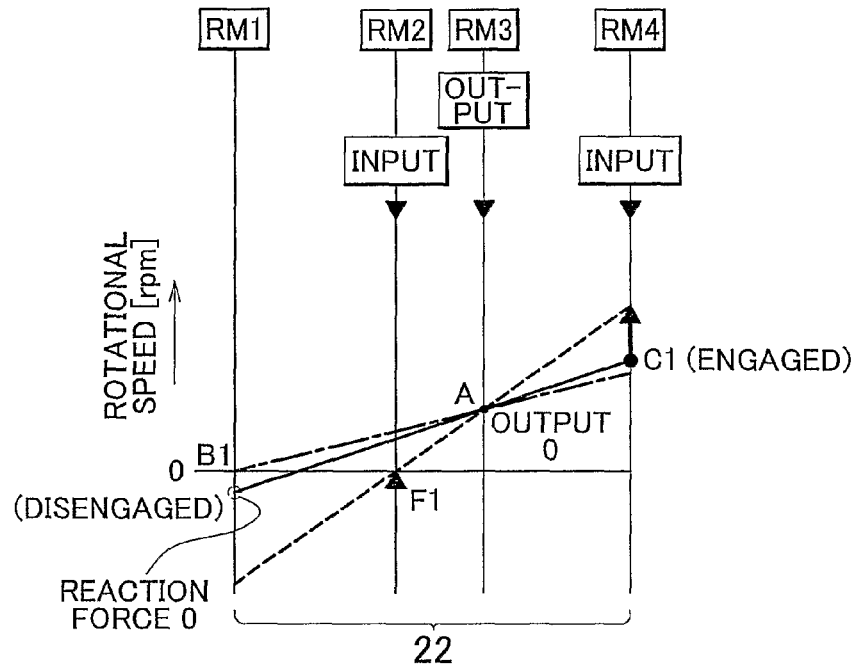
FIGS. 9A and 9B are conceptual diagrams showing a point A indicating the rotational speed of a third rotational element, which is determined by the rotational speed of drive wheels, the relative rotational speeds of other rotational elements, and output torque in the embodiment of the invention, using the collinear diagram in FIG. 3.

In the automatic transmission 10 in the embodiment, if the one-way clutch F1 is in an idling state when the first gear is to be achieved by engaging the one-way clutch F1, for example, if only the clutch C1 is engaged, and the one-way clutch F1 has not been brought to a synchronized state as shown by a solid line in a collinear diagram in FIG. 9A, the power transmission path in the automatic transmission 10 is not formed, that is, power transmission in the automatic transmission 10 is interrupted, in other words, the automatic transmission 10 is in a so-called neutral state. Thus, drive power is not transmitted to the drive wheels 38. More specifically, a reaction force against input torque is not generated, and therefore, output torque is zero.

For example, if an acceleration request is made by operating the accelerator pedal 62 when the one-way clutch F1 is in the idling state, the rotational speed of the fourth rotational element RM4 is increased as shown by an arrow in FIG. 9A due to an increase in the engine rotational speed $N_E$ (i.e., the turbine rotational speed $N_T$). Thus, in FIG. 9A, the solid line pivots around a point A indicating the rotational speed of the third rotational element RM3, which is determined by the rotational speed of the drive wheels 38. As a result, the rotational speed of the second rotational element RM2 is decreased, and thus, the rotational direction of the one-way clutch F1 is changed toward the rotational direction in which the one-way clutch F1 is brought to the synchronized state (that is, the rotational speed of the one-way clutch F1 is decreased). In the collinear diagram in FIG. 9A, a dashed line indicates that the one-way clutch F1 is in the synchronized state. In the collinear diagram in FIG. 9A, a chain line indicates that the brake B1 is engaged and thus, the second gear is achieved.

When the one-way clutch F1 is brought to the synchronized state, the engine torque $T_E$ is transmitted in a stepwise manner, and thus, the torque is sharply increased. In addition, torque oscillates due to torsional vibration of a drive system. As a result, a synchronization shock may occur. Also, even if an acceleration request is made, the drive power is not transmitted until the one-way clutch F1 is brought to the synchronized state.

Figure 9B:
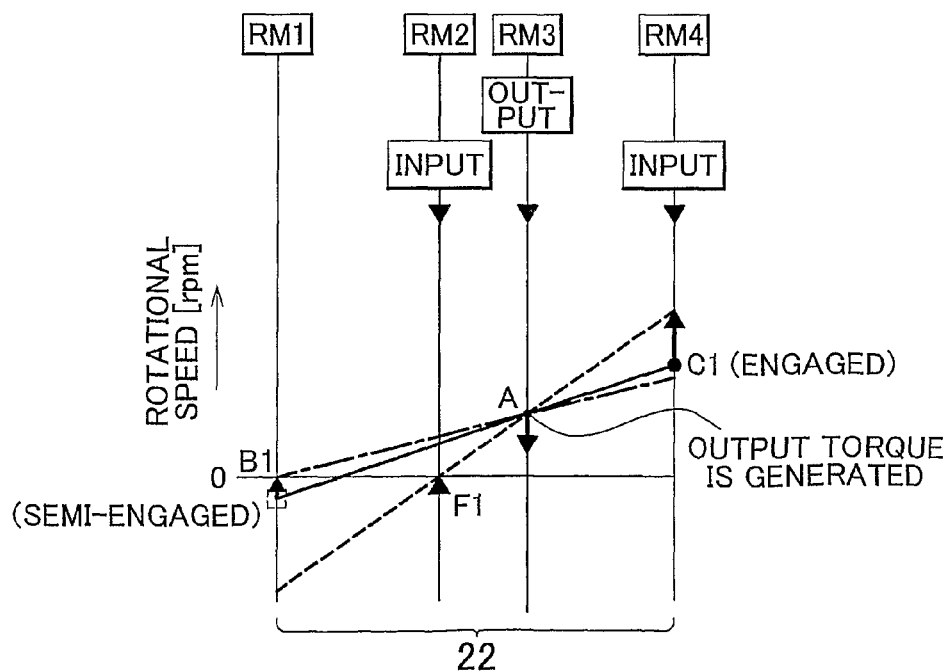

Accordingly, in the embodiment, if an acceleration request is made in the case where the one-way clutch F1 is in the idling state when the first gear, which is a first predetermined gear, is to be achieved by engaging the one-way clutch F1, torque is transmitted through the friction engagement device used to achieve a second predetermined gear at which the one-way clutch F1 is maintained in the idling state, and the rotational direction of the one-way clutch F1 continues to be changed toward the rotational direction in which the one-way clutch F1 is brought to the synchronized state due to an increase in the engine rotational speed $N_E$, as shown in FIG. 9B, in order to improve the drive power response and to reduce the synchronization shock. In the automatic transmission 10 in the embodiment, the second predetermined gear is a gear at which the input rotational speed $N_{IN}$ of the automatic transmission 10 is lower than that at the first predetermined gear (i.e., the first gear), that is, the second predetermined gear is a higher gear than the first predetermined gear (i.e., the first gear). For example, the second predetermined gear may be the second gear. Accordingly, the torque is transmitted through the brake B1, which is used to achieve the second gear.

More specifically, instead of completely engaging the brake B1, the brake B1 is brought to a semi-engaged state so that predetermined torque is transmitted through the brake B1, and thus, output torque $T_{OUT}$ is output from the automatic transmission 10. At this time, because the brake B1 is in the semi-engaged state, a force is applied to the one-way clutch F1 in a rotational direction opposite to the rotational direction in which the one-way clutch F1 is synchronized. Therefore, an engine torque increase control is executed to increase the engine torque $T_E$ to a value larger than the driver required engine torque $T_{EDEM}$ by a predetermined value so that the rotational direction of the one-way clutch F1 continues to be changed toward the rotational direction in which the one-way clutch F1 is brought to the synchronized state. The driver required engine torque $T_{EDEM}$ is the required engine output torque set according to the required acceleration amount.

Hereinafter, the control function, which is performed by the electronic control unit 100 to improve the drive power response and to reduce the synchronization shock, will be described more specifically. Referring again to FIG. 6, the electronic control unit 100 functionally further includes an engaged state determination portion 106, an acceleration request determination portion 108, a pre-synchronization control portion 110, and a post-synchronization control portion 112.

The engaged state determination portion 106 determines whether the one-way clutch F1 is in an engaged state when the first gear is to be achieved by engaging the one-way clutch F1. For example, the shift control portion 104 determines whether the first gear is to be achieved by engaging the one-way clutch F1 based on the shift map. When the shift control portion 104 determines that the first gear is to be achieved, the engaged state determination portion 106 determines whether the one-way clutch F1 is in the engaged state (i.e., the synchronized state), for example, based on whether the actual turbine rotational speed $N_T$ is equal to a synchronous rotational speed (=the gear ratio (speed ratio) $\gamma 1 \times$the output rotational speed $N_{OUT}$) of the turbine rotational speed $N_T$ at the first gear. The synchronous rotational speed is uniquely determined based on the output rotational speed $N_{OUT}$ and the gear ratio (speed ratio) $\gamma 1$ at the first gear. The engaged state determination portion 106 determines whether the actual turbine rotational speed $N_T$ is equal to the synchronous rotational speed, for example, based on whether a difference between the actual turbine rotational speed $N_T$ and the synchronous rotational speed is equal to or smaller than a predetermined difference. When the difference between the actual turbine rotational speed $N_T$ and the synchronous rotational speed is equal to or smaller than the predetermined difference, it is determined that the actual turbine rotational speed $N_T$ is equal to the synchronous rotational speed.

The acceleration request determination portion 108 determines whether a request for accelerating the vehicle is made. For example, the acceleration request determination portion 108 determines whether the request for accelerating the vehicle is made, based on whether the operation amount of the accelerator pedal 62 is increased, for example, based on whether the accelerator pedal 62, which has not been operated, is operated.

In the case where the shift control portion 104 determines that the first gear is to be achieved by engaging the one-way clutch F1; the engaged state determination portion 106 determines that the one-way clutch F1 has not yet been brought to the engaged state (the synchronized state), that is, the engaged state determination portion 106 determines that the one-way clutch F1 is in the idling state when the first gear is to be achieved; and the acceleration request determination portion 108 determines that the request for accelerating the vehicle is made, the pre-synchronization control portion 110 selects the second gear as the second predetermined gear at which the one-way clutch F1 is maintained in the idling state. The purpose of selecting the second gear is not to actually achieve the second gear. The second gear is tentatively selected to transmit drive power when the one-way clutch F1 is in the idling state. In other words, the pre-synchronization control portion 110 selects the brake B1 used to achieve the second gear at which the one-way clutch F1 is maintained in the idling state, as the friction engagement device whose engagement force is to be generated (i.e., the friction engagement device through which torque is to be transmitted) to transmit drive power when the one-way clutch F1 is in the idling state. Then, the pre-synchronization control portion 110 executes a pre-synchronization control to transmit the torque through the brake B1 used to achieve the second gear, and to continue to change the rotational direction of the one-way clutch F1 toward the rotational direction in which the one-way clutch F1 is brought to the synchronized state, according to the acceleration request For example, the pre-synchronization control portion 110 outputs a command to the shift control portion 104 to transmit torque through the brake B1, and outputs a command to the engine output control portion 102 to increase the engine torque $T_E$ to a value larger than the driver required engine torque $T_{EDEM}$ corresponding to the required acceleration amount so that a target value (target output torque) $T_{OUT}{}^*$ of the output torque of the automatic transmission 10 is achieved, and the turbine rotational speed $N_T$ is increased according to a target value (a target turbine rotational speed) $N_T{}^*$ set to change the rotational direction of the one-way clutch F1 toward the rotational direction in which the one-way clutch F1 is brought to the synchronized state (that is, the engine rotational speed $N_E$ is increased). The target output torque $T_{OUT}*$ is increased as the required acceleration amount (for example, the accelerator pedal operation amount $A_{CC}$) is increased.

More specifically, the output torque $T_{OUT}$ of the automatic transmission 10 before the one-way clutch F1 is brought to the synchronized state is calculated based on a first predetermined relational expression, for example, the following expression (1) so that the output torque $T_{OUT}$ is increased with an increase in the torque capacity (clutch torque) $T_C$ of the brake B1, and the output torque $T_{OUT}$ is increased with an increase in an engine torque increase amount $T_{UP}$ by which the engine torque $T_E$ is increased. $T_{OUT}=0.07\times(T_{EDEM}+T_{UP})+3.11\times T_C$ (1).

Also, a turbine speed increase amount $\Delta N_T$, by which the turbine rotational speed $N_T$ is increased, is calculated based on a second predetermined relational expression, for example, the following expression (2) so that the turbine speed increase amount $\Delta N_T$ is decreased with an increase in the clutch torque $T_C$ of the brake B1, and the turbine speed increase amount $\Delta N_T$ is increased with an increase in the engine torque increase amount $T_{UP}$. $\Delta N_T=6.39\times T_{EDEM}+6.39\times T_{UP}-11.1\times T_C$ (2). The values in the expressions (1) and (2), such as 0.07 and 3.11, are constant values that are uniquely calculated based on, for example, inertia moment of the rotational member and the gear ratio, in the vehicle, the power transmission apparatus including the automatic transmission 10, or the like.

The pre-synchronization control portion 110 executes the pre-synchronization control to generate the clutch torque $T_C$ and to increase the engine torque $T_E$ to a value larger than the driver required engine torque $T_{EDEM}$ by the engine torque increase amount $T_{UP}$, based on the expression (1) and the expression (2) so that the output torque $T_{OUT}$ of the automatic transmission 10 is made equal to the target output torque $T_{OUT}*$ determined based on the operation performed by the driver. In other words, the pre-synchronization control portion 110 determines the clutch torque $T_C$ and the engine torque increase amount $T_{UP}$ using the expression (1) and the expression (2) so that the target output torque $T_{OUT}*$ is achieved, and the turbine rotational speed $N_T$ is increased according to the target turbine rotational speed $N_T*$. Then, the pre-synchronization control portion 110 outputs the command that generates the clutch torque $T_C$ of the brake B1, and the command that generates the engine torque $T_E$ equal to the value obtained by adding the engine torque increase amount $T_{UP}$ to the driver required engine torque $T_{EDEM}$. According to the command, the shift control portion 104 outputs, to the hydraulic pressure control circuit 40, a valve command signal (a hydraulic pressure control value) to generate the clutch torque $T_C$ of the brake B1. Also, according to the command, for example, the engine output control portion 102 outputs the engine output control command signal SE that controls the throttle valve opening amount $\theta_{TH}$ to generate the engine torque $T_E$ equal to the value obtained by adding the engine torque increase amount $T_{UP}$ to the driver required engine torque $T_{EDEM}$.

For example, the target output torque $T_{OUT}*$, which is used after the one-way clutch F1 is brought to the synchronized state, is set according to the driver required engine torque $T_{EDEM}$ that is increased with an increase in the accelerator pedal operation amount $A_{CC}$ (for example, the target output torque $T_{OUT}*$, which is used after the one-way clutch F1 is brought to the synchronized state, is set to a value obtained by multiplying the driver required engine torque $T_{EDEM}$ by the gear ratio (speed ratio) $\gamma 1$ at the first gear). For example, the target output torque $T_{OUT}*$, which is used before the one-way clutch F1 is brought to the synchronized state, is set to gradually increase toward the target output torque $T_{OUT}*$ used after the one-way clutch F1 is brought to the synchronized state so that the driver is not likely to feel that drive power is transmitted with delay after the accelerator pedal is depressed, and a shock due to the increase in the drive power is suppressed.

The target turbine rotational speed $N_T*$, which is used after the one-way clutch F1 is brought to the synchronized state, is equal to the synchronous rotational speed of the turbine rotational speed $N_T$ at the first gear. For example, the target turbine rotational speed $N_T*$, which is used before the one-way clutch F1 is brought to the synchronized state, is set to gradually increase toward the synchronous rotational speed of the turbine rotational speed $N_T$ so that a rate, at which the rotational speed of the one-way clutch F1 is changed toward a synchronous rotational speed of the rotational speed of the one-way clutch F1, is made equal to or slightly lower than that when the clutch torque $T_C$ of the brake B1 is not generated. The target turbine rotational speed $N_T*$ is set in this manner, to quickly bring the one-way clutch F1 to the synchronized state, and to quickly end the control that transmits the drive power before the one-way clutch F1 is brought to the synchronized state.

After the one-way clutch F1 is brought to the synchronized state, for example, after the engaged state determination portion 106 determines that the one-way clutch F1 is in the engaged state (the synchronized state) at the first gear, instead of the above-described pre-synchronization control executed by the pre-synchronization control portion 110, the post-synchronization control portion 112 outputs, to the shift control portion 104, a command that decreases the clutch torque $T_C$ of the brake B1, and outputs, to the engine output control portion 102, a command that decreases the engine torque increase amount $T_{UP}$ so that the target output torque $T_{OUT}*$ is achieved using only the driver required engine torque $T_{EDEM}$.

More specifically, after the one-way clutch F1 is brought to the synchronized state, the output torque $T_{OUT}$ of the automatic transmission 10 is calculated according to a third predetermined relational expression, for example, the following expression (3) so that the output torque $T_{OUT}$ is decreased with an increase in the clutch torque $T_C$ of the brake B1, and the output torque $T_{OUT}$ is increased with an increase in the engine torque increase amount $T_{UP}$. $T_{OUT}=3.92\times T_{EDEM}+3.92\times T_{UP}-3.99\times T_C$ (3). Values in the expression (3), such as 3.92 and 3.99, are constant values that are uniquely calculated based on, for example, inertia moment of the rotational member and the gear ratio, in the vehicle, the power transmission apparatus including the automatic transmission 10, or the like, as well as the values in the expressions (1) and (2).

Then, the post-synchronization control portion 112 executes a post-synchronization control to decrease the engine torque increase amount $T_{UP}$ and the clutch torque $T_C$ of the brake B to zero in a predetermined time so that the target output torque $T_{OUT}*$ corresponding to the driver required engine torque $T_{EDEM}$ set in the term ($3.92\times T_{EDEM}$) in the expression (3) is achieved, while making the term ($3.92\times T_{UP}-3.99\times T_C$) equal to zero, that is, while maintaining the relation ($3.92\times T_{UP}=3.99\times T_C$). In other words, the post-synchronization control portion 112 executes the post-synchronization control in a manner such that the driver does not feel that the control is executed. For example, the post-synchronization control portion 112 outputs a command that gradually decreases the engine torque increase amount $T_{UP}$ to zero in the predetermined time after the one-way clutch F1 is brought to the synchronized state, and outputs a command that gradually decreases the clutch torque $T_C$ of the brake B1 according to the expression (3). According to the command, the shift control portion 104 outputs, to the hydraulic pressure control circuit 40, the valve command signal (the hydraulic pressure command value) that gradually decreases the clutch torque $T_C$ of the brake B1 to disengage the brake B1. Also, for example, the engine output control portion 102 outputs the engine output control command signal SE that controls the throttle valve opening amount $\theta_{TH}$ to gradually decrease that engine torque increase amount $T_{UP}$. The above-described predetermined time is set in advance so that a series of controls, which is executed to transmit the drive power before the one-way clutch F1 is brought to the synchronized state, quickly ends after the one-way clutch F1 is brought to the synchronized state.

Figure 10:
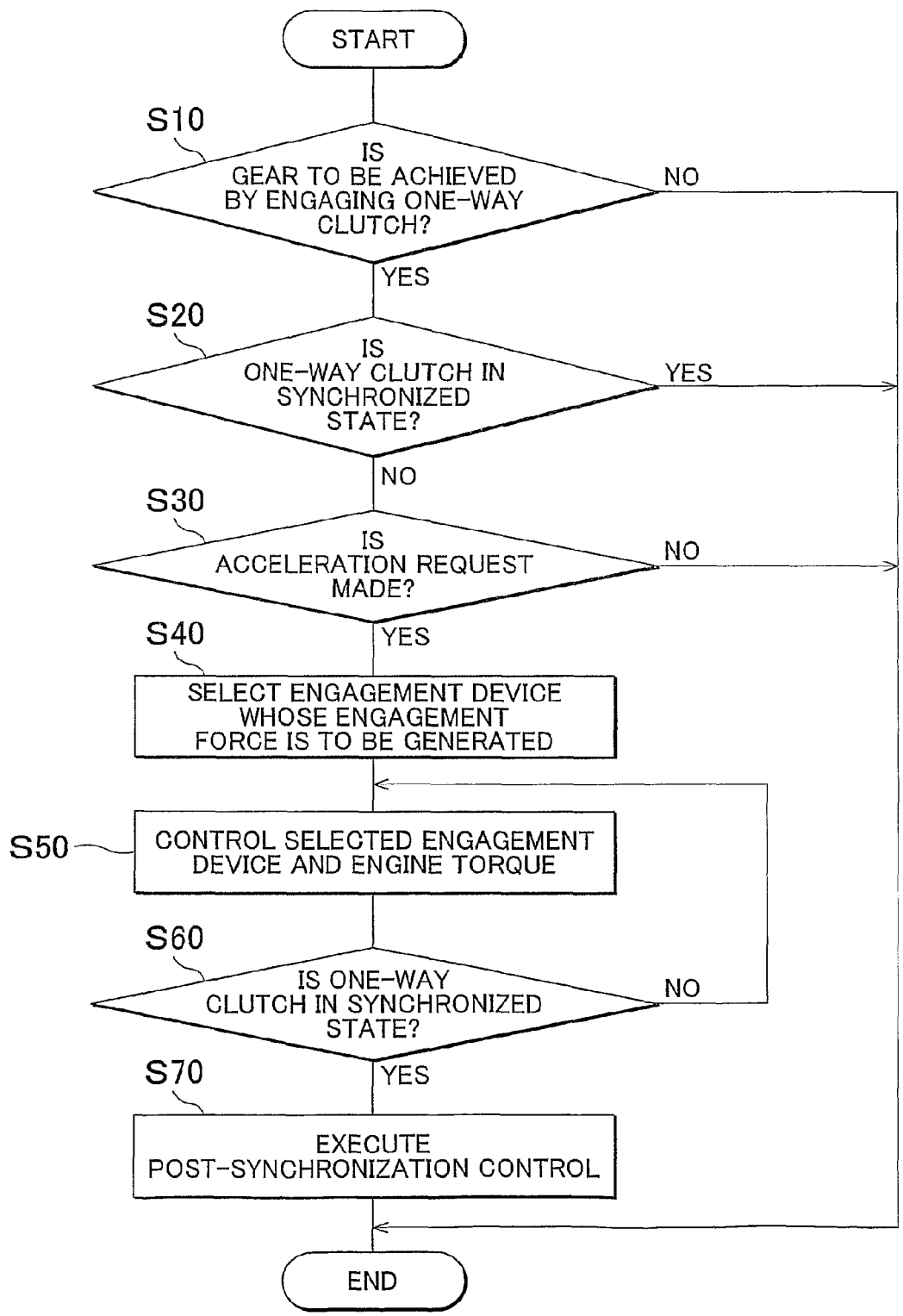
FIG. 10 is a flowchart showing a main portion of a control operation performed by the electronic control unit, that is, a control operation performed to improve a drive power response, and to reduce a synchronization shock in the embodiment of the invention.
Figure 11:
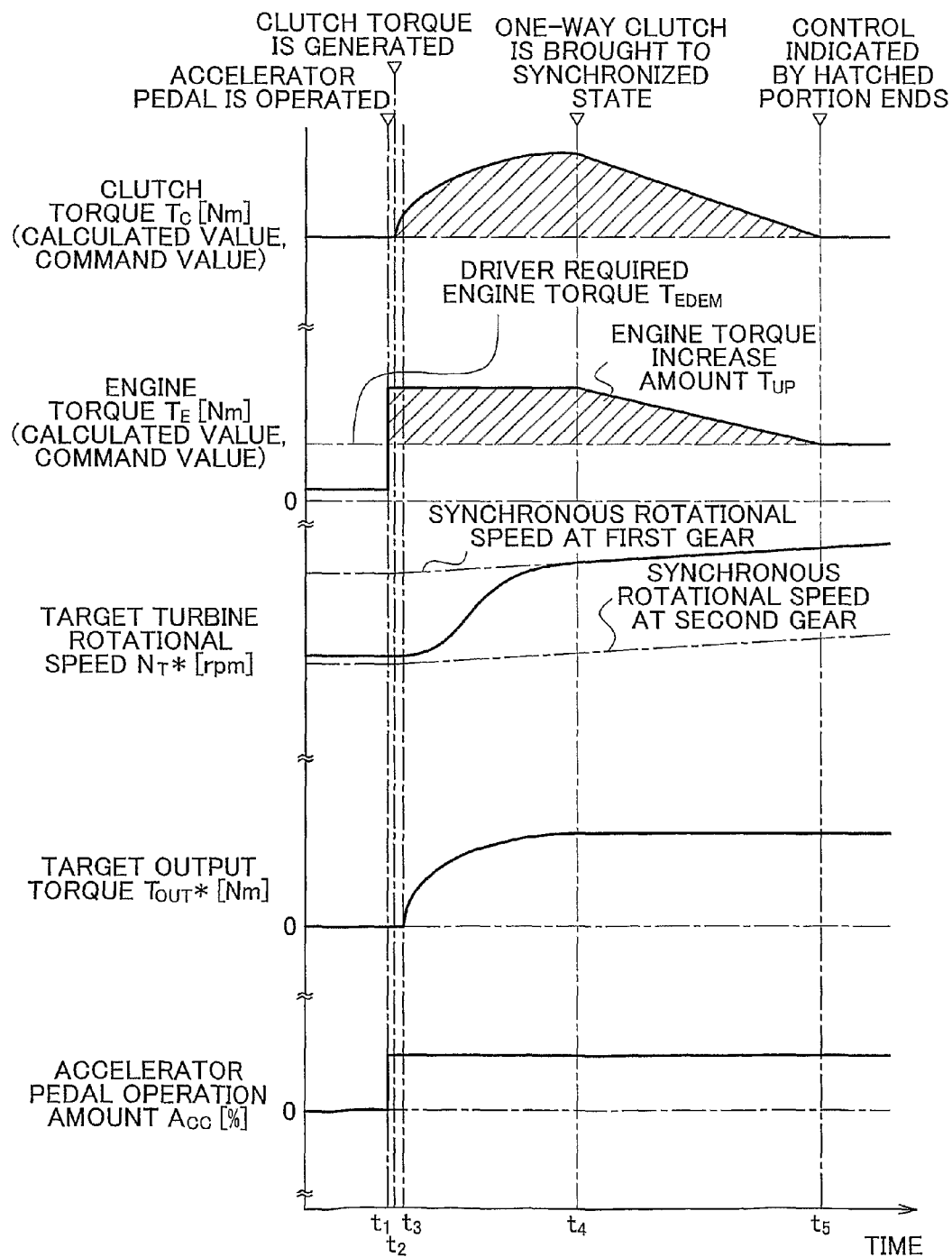
FIG. 11 is a time chart showing the control operation in the embodiment of the invention shown in the flowchart in FIG. 10.
Figure 12:
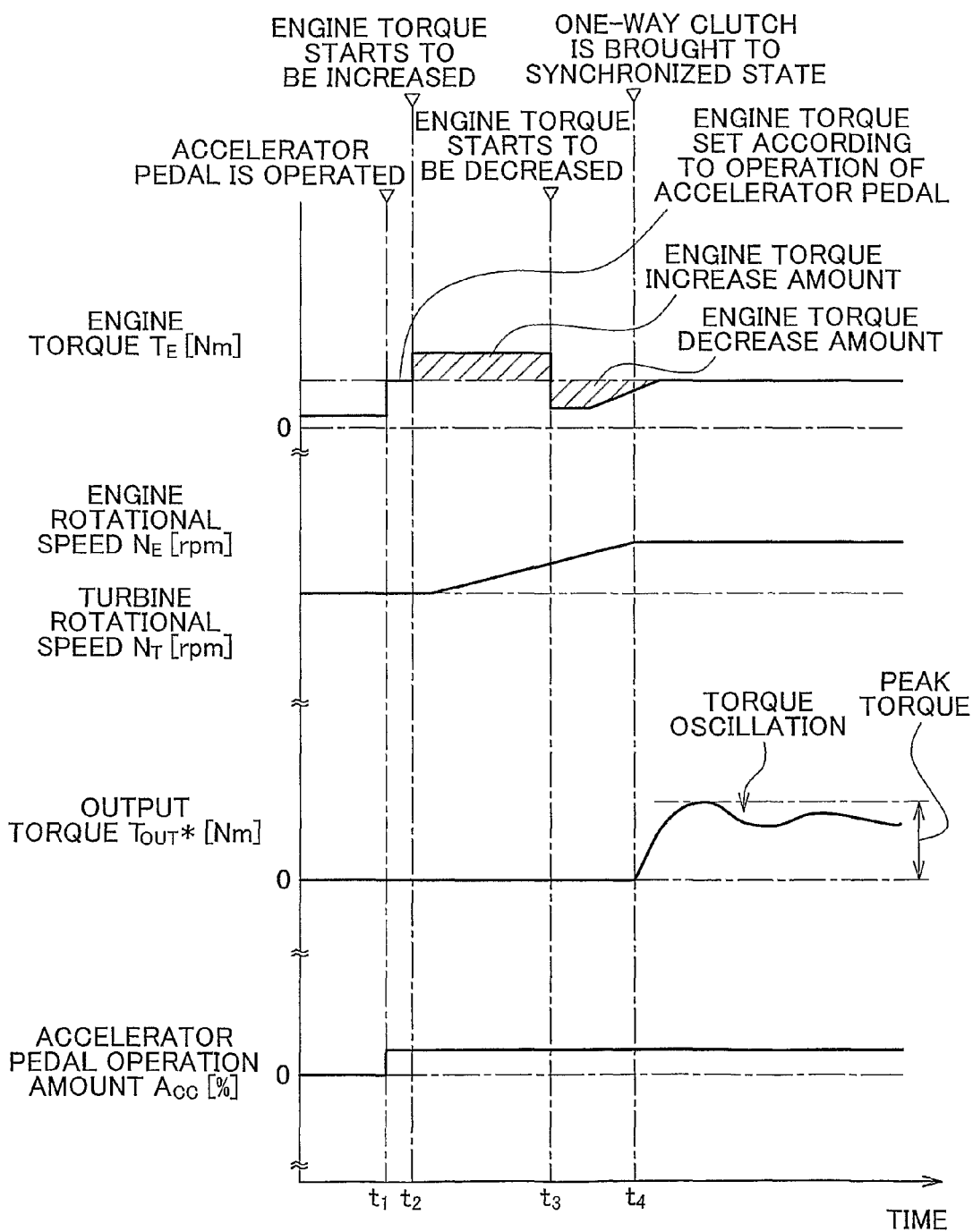
FIG. 12 is a time chart showing a conventional control operation performed if an acceleration request is made in the case where a one-way clutch is in an idling state when a gear is to be achieved by engaging the one-way clutch.

FIG. 10 is a flowchart showing a main portion of a control operation performed by the electronic control unit 100, that is, the control operation performed to improve the drive power response and to reduce the synchronization shock. For example, the control operation is performed in an extremely short cycle time of, for example, several msec to several tens of msec, and is repeatedly performed. FIG. 11 is a time chart showing the control operation shown in the flowchart in FIG. 10. FIG. 12 is a time chart showing the conventional operation.

In the control operation shown in FIG. 12, the drive power response is improved and the synchronization shock is reduced only by controlling the output of the engine. That is, the drive power response and the synchronization shock cannot be separately controlled. Therefore, it is necessary to instantaneously change the control from the engine torque increase control to the engine torque decrease control. Accordingly, it may be difficult to improve the drive power response, and to reduce the synchronization shock at the same time, depending on the response of a change in the engine torque. For example, if the engine torque is increased by a large amount to improve the drive power response, the control needs to be quickly changed to the engine torque decrease control. Therefore, the synchronization shock may not be appropriately reduced, depending on the response of a change in the engine torque. Also, if the engine torque is decreased by a large amount to reduce the synchronization shock, the drive power response may be reduced. The above-described problem is not known.

In the flowchart according to the embodiment shown in FIG. 10, first, in step S10 corresponding to the shift control portion 104, it is determined whether the first gear is to be achieved using the one-way clutch F1, that is, whether the first gear is to be achieved by engaging the one-way clutch F1, for example, based on the shift map. If it is determined that the first gear is not to be achieved, that is, if a negative determination is made in step S10, the routine ends. If it is determined that the first gear is to be achieved, that is, if an affirmative determination is made in step S10, it is determined whether the one-way clutch F1 is in the engaged state, that is, whether the one-way clutch F1 is in the synchronized state when the first gear is to be engaged by engaging the one-way clutch F1, in step S20 corresponding to the engaged state determination portion 106.

If the one-way clutch F1 has already been brought to the synchronized state, that is, if an affirmative determination is made in step S20, the routine ends. If the one-way clutch F1 has not yet been brought to the synchronized state, that is, if a negative determination is made in step S20, it is determined whether a request for accelerating the vehicle is made, for example, based on whether the accelerator pedal 62, which has not been operated, is operated, in step S30 corresponding to the acceleration request determination portion 108. If the accelerator pedal 62 is not operated, that is, if a negative determination is made in step S30, the routine ends. If the accelerator pedal 62 is operated, that is, if an affirmative determination is made in step S30, the brake B1 used to achieve the second gear at which the one-way clutch F1 is maintained in the idling state, is selected as the friction engagement device whose engagement force is to be generated (i.e., the friction engagement device through which torque is to be transmitted) to transmit the drive power when the one-way clutch F1 is in the idling state (at time point $t_1$ in FIG. 11), in step S40 corresponding to the pre-synchronization control portion 110.

Then, in step S50 corresponding to the pre-synchronization control portion 110, the clutch torque $T_C$ and the engine torque increase amount $T_{UP}$ are determined using the above-described expressions (1) and (2), for example, as shown in FIG. 11 so that the target output torque $T_{OUT}{}^*$, which is increased from time point $t_3$ in FIG. 11, is achieved, and the turbine rotational speed $N_T$ is increased according to, for example, the target turbine rotational speed $N_T{}^*$ shown in FIG. 11 that is set to change the rotational direction of the one-way clutch F1 toward the rotational direction in which the one-way clutch F1 is brought to the synchronized state. Then, the command is output to the shift control portion 104 so that the determined clutch torque $T_C$ of the brake B1 is generated (from time point $t_2$ to time point $t_4$ in FIG. 11). In addition, the command is output to the engine output control portion 102 to generate the engine torque $T_E$ equal to the value obtained by adding the engine torque increase amount $T_{UP}$ to the driver required engine torque $T_{EDEM}$ (from time point $t_1$ to time point $t_4$ in FIG. 11).

Then, in step S60 corresponding to the engaged state determination portion 106, it is determined whether the one-way clutch F1 is in the synchronized state. If the one-way clutch F1 has not yet been brought to the synchronized state, that is, if a negative determination is made in step S60, the routine returns to step S50, and step 50 and step 60 are repeatedly executed. If the one-way clutch F1 has been brought to the synchronized state, that is, if an affirmative determination is made in step S60, a post-synchronization control is executed to decrease the clutch torque $T_C$ of the brake B1 and to decrease the engine torque increase amount $T_{UP}$ so that the target output torque $T_{OUT}{}^*$ is achieved using only the driver required engine torque $T_{EDEM}$ in step S70 corresponding to the post-synchronization control portion 112, instead of the pre-synchronization control executed in step S50 to generate the clutch torque $T_C$ of the brake B1 and to generate the engine torque $T_E$ equal to the value obtained by adding the engine torque increase amount $T_{UP}$ to the driver required engine torque $T_{EDEM}$. For example, the command is output to the engine output control portion 102 to gradually decrease the engine torque increase amount $T_{UP}$ to zero in the predetermined time after the one-way clutch F1 is brought to the synchronized state, and the command is output to the shift control portion 104 to gradually decrease the clutch torque $T_C$ of the brake B1 according to the above-described expression (3) (from time point $t_4$ to time point $t_5$ in FIG. 11).

As described above, according to the embodiment, for example, if an acceleration request is made by operating the accelerator pedal 62 in the case where the one-way clutch F1 is in the idling state when the first predetermined gear (the first gear) is to be achieved, the pre-synchronization control portion 110 executes the pre-synchronization control to generate the clutch torque of the brake B1 that is the friction engagement device used to achieve the second predetermined gear (the second gear) at which the one-way clutch F1 is maintained in the idling state. Therefore, in the case where the one-way clutch F1 is in the idling state, that is, the one-way clutch F1 has not yet been brought to the synchronized state when the first gear is to be achieved, the output torque $T_{OUT}$ is output from the automatic transmission 10. At this time, the second gear is not achieved by the pre-synchronization control executed by the pre-synchronization control portion 110. The rotational direction of the one-way clutch F1 continues to be changed toward the rotational direction in which the one-way clutch F1 is brought to the synchronized state, according to the acceleration request. Therefore, the one-way clutch F1 is reliably brought to the synchronized state, and thus, the first gear is achieved. Thus, before the one-way clutch F1 is brought to the synchronized state, the output torque $T_{OUT}$ is output, and the drive power response is improved. In addition, because the output torque $T_{OUT}$ has already been output when the one-way clutch F1 is brought to the synchronized state, the output torque $T_{OUT}$ is not increased when the one-way clutch F1 is brought to the synchronized state. Thus, the synchronization shock is suppressed.

In other words, because the clutch torque $T_C$ of the brake B1, which is used to achieve the second gear, is generated, the rotational direction of the one-way clutch F1 is changed at a low rate toward the rotational direction in which the one-way clutch F1 is brought to the synchronized state, as compared to the case where the rotational direction of the one-way clutch F1 is changed toward the rotational direction in which the one-way clutch F1 is brought to the synchronized state, according to the acceleration request, when the clutch torque $T_C$ of the brake B1 is not generated. Thus, it is possible to suppress the synchronization shock. In this case, the synchronization of the one-way clutch F1 is delayed as compared to the case where the one-way clutch F1 is brought to the synchronized state, according to the acceleration request, when the clutch torque $T_C$ of the brake B1 is not generated. However, because the output torque $T_{OUT}$ is output before the one-way clutch F1 is brought to the synchronized state, the drive power response is improved, that is, the drive power response is not decreased.

Accordingly, if the acceleration request is made in the case where the one-way clutch F1 is in the idling state when the gear is to be achieved by engaging the one-way clutch F1, it is possible to improve the drive power response and to reduce the synchronization shock.

Also, according to the embodiment, the pre-synchronization control portion 110 executes the pre-synchronization control to generate the clutch torque $T_C$ of the brake B used to achieve the second gear, and to increase the engine torque $T_E$ to a value larger than the driver required engine torque $T_{EDEM}$ corresponding to the required acceleration amount so that the target output torque $T_{OUT}*$, which is increased with an increase in the required acceleration amount, is achieved, and the turbine rotational speed $N_T$ is increased according to the target turbine rotational speed $N_T*$ set to change the rotational direction of the one-way clutch F1 toward the rotational direction in which the one-way clutch F1 is brought to the synchronized state. Therefore, the output torque $T_{OUT}$ is appropriately output from the automatic transmission 10 before the one-way clutch F1 is brought to the synchronized state. In addition, the one-way clutch F1 is reliably brought to the synchronized state.

Also, according to the embodiment, the pre-synchronization control portion 110 executes the pre-synchronization control to generate the clutch torque $T_C$ of the brake B1 and to increase the engine torque $T_E$ to a value larger than the driver required engine torque $T_{EDEM}$ by the engine torque increase amount $T_{UP}$, based on the above-described expressions (1) and (2) so that the output torque $T_{OUT}$ of the automatic transmission 10 is made equal to the target output torque $T_{OUT}*$ determined based on the operation performed by the driver. That is, the clutch torque $T_C$ of the brake B1 used to achieve the second gear and the engine torque increase amount $T_{UP}$ are calculated based on the above-described expressions (1) and (2) so that the output torque $T_{OUT}$ is made equal to the target output torque $T_{OUT}*$, and the turbine rotational speed $N_T$ is increased according to the target turbine rotational speed $N_T*$. Based on the calculated clutch torque $T_C$ and the calculated engine torque increase amount $T_{UP}$, the operation of the brake B1 and the engine torque are appropriately controlled.

Also, according to the embodiment, after the one-way clutch F1 is brought to the synchronized state, instead of the pre-synchronization control executed by the pre-synchronization control portion 110, the post-synchronization control portion 112 executes the post-synchronization control to decrease the clutch torque $T_C$ of the brake B1 used to achieve the second gear, and to decrease the engine torque increase amount $T_{UP}$ so that the target output torque $T_{OUT}*$ is achieved using only the driver required engine torque $T_{EDEM}$. Therefore, after the one-way clutch F1 is brought to the synchronized state, the clutch torque $T_C$ of the brake B1, which is generated by the pre-synchronization control executed by the pre-synchronization control portion 110, is quickly decreased to zero, and the engine torque increase amount $T_{UP}$ used in the pre-synchronization control executed by the pre-synchronization control portion 110 is quickly decreased to zero. Thus, the normal control is quickly restarted so that the target output torque $T_{OUT}*$ is achieved using only the driver required engine torque $T_{EDEM}$.

Also, according to the embodiment, the post-synchronization control portion 112 executes the post-synchronization control to gradually decrease the engine torque increase amount $T_{UP}$ to zero, and to gradually decrease the clutch torque $T_C$ of the brake B1 used to achieve the second gear based on the above-described expression (3), in the predetermined time after the one-way clutch F1 is brought to the synchronized state. Thus, the clutch torque $T_C$ of the brake B1, which is generated by the pre-synchronization control executed by the pre-synchronization control portion 110, is decreased to zero, and the engine torque increase amount $T_{UP}$, which is used in the pre-synchronization control executed by the pre-synchronization control portion 110, is decreased to zero based on the expression (3) in the predetermined time after the one-way clutch F1 is brought to the synchronized state.

Although the embodiment of the invention has been described in detail with reference to the drawings, the invention may be realized in other embodiments.

For example, in the above-described embodiment, the first predetermined gear is the first gear, and the second predetermined gear is the second gear. However, for example, the first predetermined gear may be any gear as long as the gear is achieved by engaging the one-way clutch. Also, the second predetermined gear may be any gear as long as the one-way clutch is maintained in the idling state at the gear. One or more gears are employed as each of the first predetermined gear and the second predetermined gear, depending on the configuration for achieving gears in a vehicle automatic transmission.

Also, in the above-described embodiment, the acceleration request is made by operating the accelerator pedal 62 that has not been operated. However, for example, the acceleration request may be made by further depressing the accelerator pedal 62 that has been depressed to a certain extent. Also, for example, the acceleration request may be an acceleration request in a well-known cruise control.

The above-described embodiments of the invention are example embodiments, and various modifications may be made to the above-described embodiments of the invention based on knowledge of persons skilled in the art.

The invention claimed is:

1. A control apparatus for a vehicle automatic transmission in which a plurality of gears with different speed ratios are achieved by selectively engaging a plurality of friction engagement devices and a one-way clutch, the control apparatus comprising:
    a pre-synchronization control portion that executes a pre-synchronization control to transmit a torque to an output shaft of the vehicle automatic transmission by semi-engaging a predetermined friction engagement device among the plurality of predetermined friction engagement devices, wherein a first predetermined gear is achieved by engaging the one-way clutch, the pre-synchronization control brings the one-way clutch into a synchronized state after maintaining the one-way clutch in an idling state, and the synchronized state is an engaged state; and
    a post-synchronization control portion that executes a post-synchronization control to disengage the predetermined friction engagement device, wherein
    if an acceleration request for accelerating a vehicle is made in a case where the one-way clutch is in the idling state when the first predetermined gear is to be achieved, the pre-synchronization control portion executes the pre-synchronization control; and
    when the one-way clutch is brought to the synchronized state after the pre-synchronization control is executed, the post-synchronization control portion executes the post-synchronization control.

2. The control apparatus for the vehicle automatic transmission according to claim 1, wherein:
    the pre-synchronization control portion executes the pre-synchronization control to transmit the torque to the output shaft, and to continue to change a rotational direction of the one-way clutch from a first rotational direction toward a second rotational direction which is opposite to the first rotational direction, so that the one-way clutch is brought to the synchronized state, according to the acceleration request, if the acceleration request for accelerating the vehicle is made in the case where the one-way clutch is in the idling state when the first predetermined gear is to be achieved.

3. The control apparatus for the vehicle automatic transmission according to claim 2, wherein:
    the vehicle automatic transmission is a power transmission apparatus that transmits power output from a drive power source to a drive wheel;
    the rotational direction of the one-way clutch is changed from the first rotational direction toward the second rotational direction in which the one-way clutch is brought to the synchronized state, by increasing an input rotational speed of the vehicle automatic transmission according to the acceleration request;
    the second predetermined gear is a gear higher than a first predetermined gear, and the input rotational speed of the vehicle automatic transmission at the second predetermined gear is lower than the input rotational speed of the vehicle automatic transmission at the first predetermined gear; and
    the pre-synchronization control portion executes the pre-synchronization control to transmit the torque through the predetermined friction engagement device and to increase an output torque of the drive power source to a value larger than a required output torque of the drive power source corresponding to a required acceleration amount so that a target value of output torque of the vehicle automatic transmission is achieved, and the input rotational speed of the vehicle automatic transmission is increased according to a target value of the input rotational speed, wherein the target value of the output torque of the vehicle automatic transmission is increased with an increase in the required acceleration amount, and the target value of the input rotational speed of the vehicle automatic transmission is set to change the rotational direction of the one-way clutch from the first rotational direction toward the second rotational direction in which the one-way clutch is brought to the synchronized state.

4. The control apparatus for the vehicle automatic transmission according to claim 3, wherein
    the post-synchronization control portion executes the post-synchronization control to disengage the predetermined friction engagement device and to decrease an output torque increase amount, by which the output torque of the drive power source is increased, so that the target value of the output torque of the vehicle automatic transmission is achieved using only the required output torque of the drive power source, wherein after the one-way clutch is brought to the synchronized state, the post-synchronization control portion executes the post-synchronization control, instead of the pre-synchronization control executed by the pre-synchronization control portion.

5. The control apparatus for the vehicle automatic transmission according to claim 4, wherein:
    after the one-way clutch is brought to the synchronized state, the output torque of the vehicle automatic transmission is calculated based on a third predetermined relational expression so that the output torque of the vehicle automatic transmission is decreased with an increase in the torque capacity of the predetermined friction engagement device, and the output torque of the vehicle automatic transmission is increased with an increase in the output torque increase amount by which the output torque of the drive power source is increased; and
    the post-synchronization control portion executes the post-synchronization control to gradually decrease the output torque increase amount to zero, and to gradually decrease the torque capacity of the predetermined friction engagement device based on the third predetermined relational expression, in a predetermined time after the one-way clutch is brought to the synchronized state.

6. The control apparatus for the vehicle automatic transmission according to claim 3, wherein:
    the output torque of the vehicle automatic transmission is calculated based on a first predetermined relational expression so that the output torque of the vehicle automatic transmission is increased with an increase in a torque capacity of the predetermined friction engagement device, and the output torque of the vehicle automatic transmission is increased with an increase in an output torque increase amount by which the output torque of the drive power source is increased;
    a rotational speed increase amount, by which the input rotational speed of the vehicle automatic transmission is increased, is calculated based on a second predetermined relational expression so that the rotational speed increase amount is decreased with an increase in the torque capacity of the predetermined friction engagement device, and the rotational speed increase amount is increased with an increase in the output torque increase amount by which the output torque of the drive power source is increased; and the pre-synchronization control portion executes the pre-synchronization control to transmit the torque through the predetermined friction engagement device and to increase the output torque of the drive power source, based on the first predetermined relational expression and the second predetermined relational expression so that the output torque of the vehicle automatic transmission is equal to the target value determined based on an operation performed by a driver.

7. The control apparatus for the vehicle automatic transmission according to claim 3, wherein:

the target value of the output torque of the vehicle automatic transmission, which is used after the one-way clutch is brought to the synchronized state, is set according to the required output torque of the drive power source; and the target value of the output torque of the vehicle automatic transmission, which is used before the one-way clutch is brought to the synchronized state, is set to gradually increase toward the target value of the output torque of the vehicle automatic transmission, which is used after the one-way clutch is brought to the synchronized state.

8. The control apparatus for the vehicle automatic transmission according to claim 3, wherein:

the target value of the input rotational speed, which is used after the one-way clutch is brought to the synchronized state, is equal to a synchronous rotational speed of the input rotational speed at the first predetermined gear;

the synchronous rotational speed at the first predetermined gear is determined based on an output rotational speed of the vehicle automatic transmission and the speed ratio of the first predetermined gear; and the target value of the input rotational speed, which is used before the one-way clutch is brought to the synchronized state, is set to gradually increase toward the synchronous rotational speed.

9. The control apparatus for the vehicle automatic transmission according to claim 1, wherein the torque is transmitted to the output shaft of the vehicle automatic transmission by bringing the predetermined friction engagement device to a semi-engaged state.

10. The control apparatus for the vehicle automatic transmission according to claim 1, further comprising:

an acceleration request determination portion that determines whether the acceleration request for accelerating the vehicle is made.

11. The control apparatus for the vehicle automatic transmission according to claim 1, further comprising:

an engaged state determination portion that determines whether the one-way clutch is in the engaged state when the first predetermined gear is to be achieved by engaging the one-way clutch.

12. The control apparatus for the vehicle automatic transmission according to claim 1, wherein if no acceleration request is made in the case where the one-way clutch is in the idling state when the first predetermined gear is to be achieved, the pre-synchronization control portion does not execute the pre-synchronization control.

13. The control apparatus for the vehicle automatic transmission according to claim 1, further comprising a shift control portion that determines whether the first gear is to be achieved based on a shift map, wherein if the acceleration request for accelerating the vehicle is made in the case where the one-way clutch is in the idling state when the shift control portion determines that the first predetermined gear is to be achieved based on the shift map, the pre-synchronization control portion executes the pre-synchronization control.

14. A control method for a vehicle automatic transmission in which a plurality of gears with different speed ratios are achieved by selectively engaging a plurality of friction engagement devices and a one-way clutch, the control method comprising:

executing a pre-synchronization control to transmit a torque to an output shaft of the vehicle automatic transmission by semi-engaging a predetermined friction engagement device among the plurality of predetermined friction engagement devices, wherein a first predetermined gear is achieved by engaging the one-way clutch, the pre-synchronization control brings the one-way clutch into a synchronized state after maintaining the one-way clutch in an idling state, and the synchronized state is an engaged state; and executing a post-synchronization control to disengage the predetermined friction engagement device, wherein if an acceleration request for accelerating a vehicle is made in a case where the one-way clutch is in the idling state when the first predetermined gear is to be achieved, the pre-synchronization control portion is executed; and when the one-way clutch is brought to the synchronized state after the pre-synchronization control is executed, the post-synchronization control portion is executed.

15. The control method for the vehicle automatic transmission according to claim 14, wherein the pre-synchronization control is executed to transmit the torque to the output shaft, and to continue to change a rotational direction of the one-way clutch from a first rotational direction toward a second rotational direction which is opposite to the first rotational direction, so that the one way clutch is brought to the synchronized state, according to the acceleration request, in the acceleration request for accelerating the vehicle is made in the case where the one-way clutch is in the idling state when the first predetermined gear is to be achieved.

16. The control method for the vehicle automatic transmission according to claim 15, wherein:

the vehicle automatic transmission is a power transmission apparatus that transmits power output from a drive power source to a drive wheel;

the rotational direction of the one-way clutch is changed from the first rotational direction toward the second direction in which the one-way clutch is brought to the synchronized state, by increasing an input rotational speed of the vehicle automatic transmission according to the acceleration request;

the second predetermined gear is a gear higher than a first predetermined gear, and the input rotational speed of the vehicle automatic transmission at the second predetermined gear is lower than the input rotational speed of the vehicle automatic transmission at the first predetermined gear; and the pre-synchronization control is executed to transmit the torque through the predetermined friction engagement device and to increase an output torque of the drive power source to a value larger than a required output torque of the drive power source corresponding to a required acceleration amount so that a target value of output torque of the vehicle automatic transmission is achieved, and the input rotational speed of the vehicle automatic transmission is increased according to a target value of the input rotational speed, wherein the target value of the output torque of the vehicle automatic transmission is increased with an increase in the required acceleration amount, and the target value of the input rotational speed of the vehicle automatic transmission is set to change the rotational direction of the one-way clutch from the first rotational direction toward the second rotational direction in which the one-way clutch is brought to the synchronized state.

17. The control method for the vehicle automatic transmission according to claim 16, further comprising
executing the post-synchronization control to disengage the predetermined friction engagement device and to decrease an output torque increase amount, by which the output torque of the drive power source is increased, so that the target value of the output torque of the vehicle automatic transmission is achieved using only the required output torque of the drive power source, instead of the pre-synchronization control, after the one-way clutch is brought to the synchronized state.

18. The control method for the vehicle automatic transmission according to claim 17, wherein:
after the one-way clutch is brought to the synchronized state, the output torque of the vehicle automatic transmission is calculated based on a third predetermined relational expression so that the output torque of the vehicle automatic transmission is decreased with an increase in the torque capacity of the predetermined friction engagement device, and the output torque of the vehicle automatic transmission is increased with an increase in the output torque increase amount by which the output torque of the drive power source is increased; and
the post-synchronization control is executed to gradually decrease the output torque increase amount to zero, and to gradually decrease the torque capacity of the predetermined friction engagement device based on the third predetermined relational expression, in a predetermined time after the one-way clutch is brought to the synchronized state.

19. The control method for the vehicle automatic transmission according to claim 16, wherein:
the output torque of the vehicle automatic transmission is calculated based on a first predetermined relational expression so that the output torque of the vehicle automatic transmission is increased with an increase in a torque capacity of the predetermined friction engagement device, and the output torque of the vehicle automatic transmission is increased with an increase in an output torque increase amount by which the output torque of the drive power source is increased;
a rotational speed increase amount, by which the input rotational speed of the vehicle automatic transmission is increased, is calculated based on a second predetermined relational expression so that the rotational speed increase amount is decreased with an increase in the torque capacity of the predetermined friction engagement device, and the rotational speed increase amount is increased with an increase in the output torque increase amount by which the output torque of the drive power source is increased; and
the pre-synchronization control is executed to transmit the torque through the predetermined friction engagement device and to increase the output torque of the drive power source, based on the first predetermined relational expression and the second predetermined relational expression so that the output torque of the vehicle automatic transmission is equal to the target value determined based on an operation performed by a driver.

20. The control method for the vehicle automatic transmission according to claim 16, wherein:
the target value of the output torque of the vehicle automatic transmission, which is used after the one-way clutch is brought to the synchronized state, is set according to the required output torque of the drive power source; and
the target value of the output torque of the vehicle automatic transmission, which is used before the one-way clutch is brought to the synchronized state, is set to gradually increase toward the target value of the output torque of the vehicle automatic transmission, which is used after the one-way clutch is brought to the synchronized state.

21. The control method for the vehicle automatic transmission according to claim 16 wherein:
the target value of the input rotational speed, which is used after the one-way clutch is brought to the synchronized state, is equal to a synchronous rotational speed of the input rotational speed at the first predetermined gear;
the synchronous rotational speed at the first predetermined gear is determined based on an output rotational speed of the vehicle automatic transmission and the speed ratio of the first predetermined gear; and
the target value of the input rotational speed, which is used before the one-way clutch is brought to the synchronized state, is set to gradually increase toward the synchronous rotational speed.

22. The control method for the vehicle automatic transmission according to claim 14 wherein the torque is transmitted to the output shaft of the vehicle automatic transmission by bringing the predetermined friction engagement device to a semi-engaged state.

23. The control method for the vehicle automatic transmission according to claim 14, further comprising:
determining whether the acceleration request for accelerating the vehicle is made.

24. The control method for the vehicle automatic transmission according to claim 14, further comprising:
determining whether the one-way clutch is in the engaged state when the first predetermined gear is to be achieved by engaging the one-way clutch.

* * * * *